United States Patent
Karabacak et al.

(10) Patent No.: US 10,458,818 B2
(45) Date of Patent: Oct. 29, 2019

(54) FIBER-OPTIC BASED TRAFFIC AND INFRASTRUCTURE MONITORING SYSTEM

(71) Applicant: Fugro Technology B.V., Leidschendam (NL)

(72) Inventors: Devrez Mehmet Karabacak, Leidschendam (NL); Johannes Maria Singer, Leidschendam (NL); German Enrique Knoppers, Leidschendam (NL); John O'Dowd, Leidschendam (NL)

(73) Assignee: Fugro Technology B.V. (NL)

( * ) Notice: Subject to any disclaimer, the term of this patent is extended or adjusted under 35 U.S.C. 154(b) by 0 days.

(21) Appl. No.: 16/099,896

(22) PCT Filed: May 9, 2017

(86) PCT No.: PCT/NL2017/050288
§ 371 (c)(1),
(2) Date: Nov. 8, 2018

(87) PCT Pub. No.: WO2017/196168
PCT Pub. Date: Nov. 16, 2017

(65) Prior Publication Data
US 2019/0137305 A1 May 9, 2019

Related U.S. Application Data

(60) Provisional application No. 62/379,285, filed on Aug. 25, 2016.

(30) Foreign Application Priority Data

May 9, 2016 (NL) .................................. 2016744

(51) Int. Cl.
G08G 1/04 (2006.01)
G08G 1/01 (2006.01)
(Continued)

(52) U.S. Cl.
CPC .............. *G01D 5/353* (2013.01); *E01F 11/00* (2013.01); *G08G 1/015* (2013.01); *G08G 1/02* (2013.01); *G08G 1/04* (2013.01); *G08G 1/052* (2013.01)

(58) Field of Classification Search
CPC ....................................................... G01D 5/353
See application file for complete search history.

(56) References Cited

U.S. PATENT DOCUMENTS

| 5,260,520 A | * | 11/1993 | Muhs | G01G 19/03 177/1 |
| 7,042,369 B2 | * | 5/2006 | Hill | E01F 11/00 340/933 |
| 2016/0109036 A1 | * | 4/2016 | Elford | F16L 1/028 405/184.1 |

FOREIGN PATENT DOCUMENTS

| EP | 1183510 A1 | 3/2002 | |
| EP | 2372322 A1 | * 10/2011 | G01G 3/125 |

(Continued)

OTHER PUBLICATIONS

International Search Report and Written Opinion; PCT Application No. PCT/NL2017/050288; dated Oct. 12, 2017.

*Primary Examiner* — Joseph H Feild
*Assistant Examiner* — Pameshanand Mahase
(74) *Attorney, Agent, or Firm* — Polsinelli PC

(57) ABSTRACT

In an arrangement of a traffic infrastructure and an optic sensor system (10, 20), the traffic infrastructure has a traffic carrying surface (51) for providing support of conveyance elements (92) of a vehicle (90), therewith allowing movements of the vehicle over the traffic carrying surface. The optic sensor system (10, 20) comprising an interrogator (10) and at least one fiber optic sensor (20) arranged below the traffic carrying surface that is coupled to the interrogator. The at least one fiber optic sensor (20) comprising an optic (Continued)

fiber (21) with a plurality of optic strain-sensor elements (22) distributed over its length. The plurality of optic strain-sensor elements (22) have mutually different optical characteristics, e.g. a mutually different characteristic wavelength. The interrogator (10) is configured to transmit an optical interrogation signal into the at least one fiber optic sensor, to receive a response optical signal modulated by said fiber optic sensor, and to identify changes in the optical characteristics of the response optical signal resulting from strains induced in said optic strain-sensor elements as a result of a conveyance element (92) of a vehicle (90) moving over the traffic carrying surface (51) across said at least one fiber optic sensor. wherein the at least one fiber optic sensor (20) extends at least substantially according to a straight line in a direction at least substantially parallel to the traffic carrying surface.

20 Claims, 18 Drawing Sheets

(51) Int. Cl.
*E01F 11/00* (2006.01)
*G08G 1/015* (2006.01)
*G08G 1/02* (2006.01)
*G01D 5/353* (2006.01)
*G08G 1/052* (2006.01)

(56) References Cited

FOREIGN PATENT DOCUMENTS

| | | | |
|---|---|---|---|
| EP | 2372322 | A1 | 10/2011 |
| WO | 02065426 | A1 | 8/2002 |
| WO | 2017196168 | A1 | 11/2017 |

* cited by examiner

FIG. 5
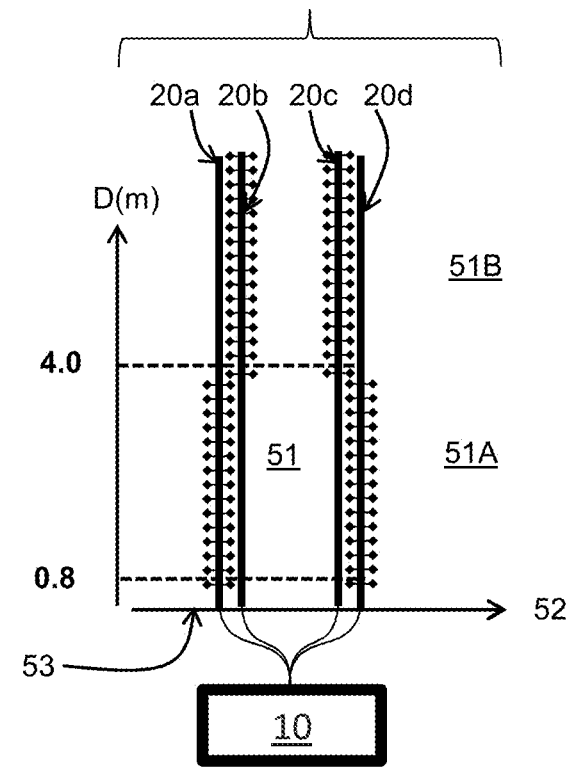
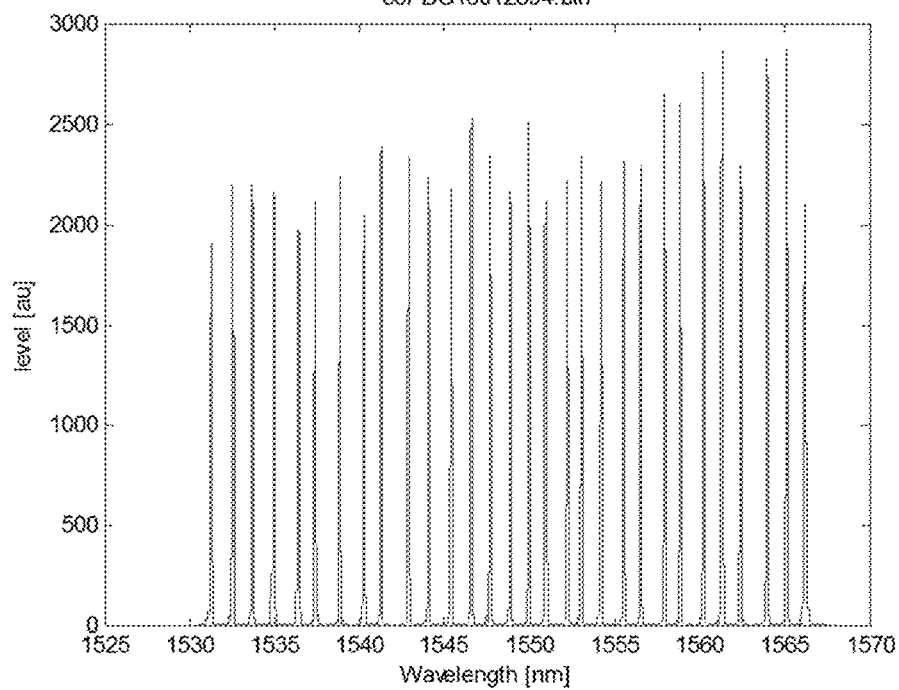
FIG. 6

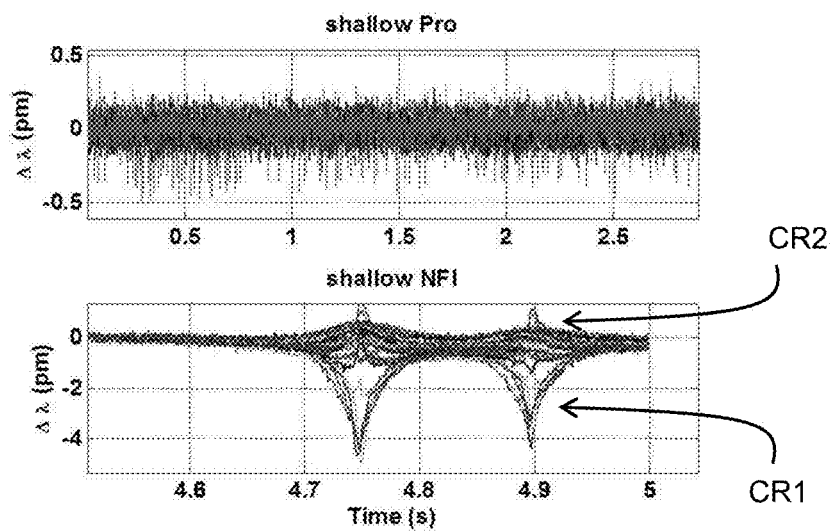

FIBER-OPTIC BASED TRAFFIC AND INFRASTRUCTURE MONITORING SYSTEM

BACKGROUND

The increasing use of traffic infrastructures entails various challenges in the fields of managing traffic and enforcing various regulations on restrictions of vehicles specific roads, as well as planning of maintenance cycles. To address such issues there is a growing need for monitoring of road traffic. The monitoring of traffic requires multiple parameters to be recorded from the roads; size and weight of vehicle, its speed, as well as the deformation each vehicle causes in the road. However, current road monitoring systems involve too many separate electronic measurement elements; induction loops, radars, cameras, and weigh-in-motion systems. This configuration results in an expensive installation with data acquisition units for each unit as well as signal and power connections to each part of the system.

EP2372322 notes that a reduction in the amount of cabling can be achieved by employing optic sensors for example, designed as Fiber Bragg Gratings disposed in a single optic fiber. The sensor device disclosed therein comprises an elongated support, which is disposed transversely in relation to the carriageway under the carriageway. The support is provided with a plurality of measuring zones, which are separated from one another in the longitudinal direction of the support by intermediate zones. The axial rigidity of the measuring zones in a direction perpendicular to the carriageway is greater than the axial rigidity of the intermediate zones in a direction perpendicular to the carriageway. Each measuring zone is provided with at least one sensor to measure deformation of this measuring zone in response to a force exerted substantially perpendicular to the carriageway. The elongated support is provided by an I-beam. When a vehicle traverses the carriageway, the I-beam subsequently deforms in a first direction, assumes a neutral state and deforms in a second direction opposite to the first direction. During deformation in the first direction, an optic sensor on the front side of the I beam subsequently is compressed by the I-beam, assumes a neutral state, and is stretched. An optic sensor on the opposite side of the I-beam subsequently is stretched, assumes a neutral state and is compressed. The optic sensors are, for example, designed as Fiber Bragg Gratings.

The support may be provided with a protective sleeve to protect the operation of the sensors against environmental influences, the support is optionally incorporated in a trough-shaped housing with a base and vertical side walls. The known sensor device is relatively costly. The protective sleeve is not strictly necessary. In the absence of this protective sleeve, the space between the flanges of the I-beam will be filled with asphalt, or other material used for construction of the carriage way. Often the space between the flanges will only be filled partially, and to an extent which can not be predicted. This is unfavorable for the reliability and accuracy of the measurement results obtained with the sensor device. Also, it is to be noted that the I-beam is an intermediate element that changes the physical characteristics to be measured, in consequence, the characteristics measured are indirect effects of the traffic on the infrastructure not reflecting the true behavior of such infrastructure.

Moreover, the use of an I-beam requires more space to be installed properly which limits the amount of sensors per linear meter that can be placed on a monitoring device.

Furthermore, the use of I-beams due to their continuous form-factor can result in cross-talk subsequent sensors thereby inducing errors into the measurement.

SUMMARY OF THE INVENTION

It is an object of the present invention to provide an improved arrangement of a traffic infrastructure and an optic sensor system.

An arrangement according to the present invention is claimed in claim 1. In the claimed arrangement the at least one fiber optic sensor comprises an optic fiber with a plurality of optic strain-sensor elements distributed over its length, which plurality of optic strain-sensor elements have mutually different optical characteristics. In particular the plurality of optic strain-sensor elements each have a respective characteristic wavelength that is sensitive to the amount of strain experienced by the optic strain-sensor elements. The at least one fiber optic sensor is provided with at least one anchor element that extends around the at least one fiber optic sensor between mutually subsequent optic strain-sensor elements. The at least one anchor element extends radially with respect to the longitudinal direction of the at least one fiber optic sensor and provides for a tight mechanical coupling between the at least one fiber optic sensor and the traffic in which it is embedded. In an embodiment, the at least one anchor element has a circumference in a plane transverse to a longitudinal direction of the at least one fiber optic sensor that is at least 1.5 times larger than a circumference of the fiber optic sensor in a plane transverse to said longitudinal direction at a position of an optic strain-sensor element.

Surprisingly, by using a sensor system according to the present invention, it is provided a high-accuracy measurement system that has almost no influence on the road behavior so this behavior can be modelled in a more accurate way.

The at least one fiber optic sensor is optically coupled to an interrogator that periodically sweeps the wavelength in a wavelength range that includes the characteristic wavelengths of all optic strain-sensor elements.

Measurements at a high spatial resolution in the longitudinal direction of the at least one fiber optic sensor are possible using an interrogator having a measurement range of at least 10 nm, preferably of at least 100 nanometer, for example about 40 nm. Furthermore, the interrogator preferably has a recording speed of at least 500 Hz, preferably at least 2000 Hz, for example in the order of 1000 Hz.

Additionally the interrogator should have a dynamic resolution that is able to track the characteristic wavelength corresponding to each of the fiber optic sensors with a resolution in a sub-picometer range and, preferably, in a range of 0.1 picometer or better.

The measurement arrangement according to the present invention renders it possible to determine solely with optic means a large variety of measurement data with a high accuracy, such as data pertaining to vehicle speed, vehicle type, vehicle loading, vehicle loading asymmetries etc.

The measurement arrangement further enables monitoring the condition of the infrastructure. For example, the occurrence of a systematic deviation of the characteristic wavelength of sensor elements of a sensor may indicate structural deformations of the infrastructure. As indicated above, such infrastructures are, preferably, a railroad or a road.

The at least one fiber optic sensor may be one of a plurality of fiber optic sensors. In the sequel a fiber optic sensor may also be denoted as "sensor", and an optic strain-sensor element may also be denoted as "sensor element". The wording traffic infrastructure may also be denoted as "infrastructure".

In an embodiment the arrangement further comprises at least one fixed/immovable mounting element at a longitudinal position between mutually opposite sides of the traffic structure. This mounting element differs from the anchoring elements in that it is substantially immovable. Contrary to the anchoring elements it does not move with the layer in the infrastructure where the fiber optic sensor is arranged. The mounting element may for example extend downward until a depth wherein substantially no deformations occur due to passing by traffic. In this way strain accumulation over longer distances can be inhibited.

In an embodiment, the arrangement the optic fiber further comprises a pair of a first and a second optic strain-sensor element with at least substantially the same optical characteristics in their neutral state, and arranged at mutually opposite sides of a longitudinal section of the at least one fiber optic sensor, and wherein the interrogator is configured to estimate a change in a gap between said first and said second optic strain-sensor element based on an interference between response optic signals received from said first and second optic strain-sensor elements. The wording neutral state is used to indicate a state of the optic strain-sensor element wherein it is free from strain. This embodiment renders possible to obtain infrastructure data within a spatial range extending between the pair of the first and the second optic strain-sensor element. The optic strain-sensor element arranged at each end of the longitudinal section, having at least substantially the same optical characteristics in their neutral state (for example reflecting at exactly the same wavelength in their neutral state) interfere with each other in a manner that depends on the gap between the sensors. This is in contrast to a single optic strain-sensor element arranged between a pair of anchors which measures local changes, e.g. within a range of a few centimeters of the fiber.

In an embodiment the arrangement further comprises at least one optic sensor element below the traffic infrastructure surface that is mechanically decoupled from the traffic infrastructure in a longitudinal direction of the fiber optic sensor.

In a variation of this embodiment the at least one optic sensor element that is mechanically decoupled in a longitudinal direction is mechanically coupled to said infrastructure in a transversal direction. In use the traffic infrastructure is being deformed in both the longitudinal direction of the optic sensor element (perpendicular to traffic flow) and in the transverse direction (direction of traffic flow). In order to better understand how the road has been deformed it is useful to have information about both directions. Some of this information can be implied from the longitudinal information. By providing an optic sensor element that is selectively sensitive to deformations more accurate information about deformations in this direction can be obtained. It is further possible to obtain more accurate information about longitudinal deformations by using this information about transversal deformations to compensate in sensor readings obtained from other sensors that are sensitive both to longitudinal and transversal deformations.

In another variation of this embodiment, the at least one optic sensor element that is mechanically decoupled in a longitudinal direction is at least substantially mechanically decoupled in any direction, wherein the interrogator module is arranged for determining a temperature based on response optical signals obtained from said mechanically decoupled optic sensor element. As in this variation the optic sensor element is mechanically fully decoupled from the infrastructure, the only remaining external factor that cause it to deform or to change an extent to which it is deformed is the temperature of the environment.

In this variation the optic sensor element is mechanically is for example decoupled from said traffic infrastructure in that it is accommodated in a rigid housing. A longitudinal section of a fiber optic sensor comprising the at least one mechanically decoupled optic sensor element may be arranged free from longitudinal tension inside said housing. Alternatively, the longitudinal section of the fiber optic sensor comprising the at least one mechanically decoupled optic sensor element may be arranged with a substantially constant pre-strain inside said housing.

In another embodiment at least one of the optic strain-sensor elements is mechanically coupled to the traffic infrastructure by a coupling element that selectively inhibits mechanical vibrations having a frequency exceeding a threshold frequency, and wherein the interrogator is configured to interrogate the at least one of the optic strain-sensor elements at a repetition rate of at least twice said threshold frequency. Although the deformations that cause the strain variations may be naturally bandwidth limited, due to dampening effects of the material of the traffic infrastructure it may be desired to provide for a further reduction in bandwidth by this coupling element, therewith rendering possible a reduction in repetition rate while avoiding aliasing in the detected signal.

In an embodiment the plurality of optic strain sensor elements includes a set of strain sensor elements arranged in mutually different angles around a measurement position within a plane substantially parallel to the traffic infrastructure surface. Further in this embodiment the interrogator is configured to estimate a strain vector indicative for a magnitude and a direction of a strain at said measurement position. In this way more specific information can be obtained about occurrence of deformations. In one example of this embodiment the set of strain sensor elements is part of a single optic fiber. In another example the strain sensor elements in the set may be part of respective optic fibers. For example a grid of measurement positions may be defined by a first, a second and a third group of optical fibers, wherein in each group the optical fibers are arrange parallel to each other and at distance from each other. For example optical fibers of the first group may be arranged in the plane in a direction transverse to a longitudinal direction of the road, optical fibers of the second group may be arranged in the plane in a direction at an angle of −120 degrees with respect to those in the first group, and optical fibers of the second group may be arranged in the plane in a direction at an angle of +120 degrees with respect to those in the first group.

In an embodiment the interrogator is configured to process a response optical signal of an optic strain sensor element to determine a relative position of a conveyance element relative to the optic strain sensor element, using a model that relates the response optical signal to said relative position. In this way a position of a vehicle can be determined with a higher accuracy than an accuracy determined by a distance between subsequent optic strain sensor elements. In an example of this embodiment the model is based on the presumption that the response optical signal is a symmetric function of the position of the conveyance element relative to the optic strain sensor element.

In a still further embodiment the interrogator is configured to process response optical signals of mutually neighboring optic strain sensor elements to determine a relative position of a conveyance element between the mutually neighboring optic strain sensor elements, using a model that relates a relationship between the response optical signals to said relative position.

In an embodiment the interrogator includes a conversion module to convert an optic response signal into a detection signal having a magnitude indicative for a detected strain of the at least one optic strain sensor element and a signal filter to determine high-frequency components in the detection signal, the interrogator being configured to further process the high frequency components to derive signal features related to traffic carried by the traffic carrying surface. By selectively processing the high frequency components in the detection signal, any deviation in the detection signal due to low frequency perturbations are rejected. signals. In particular this renders possible use of low-cost interrogators that may be inaccurate in the low frequency range, but still suitable for application in this embodiment.

In an elaboration of the previous embodiment the interrogator further includes a signal filter to determine low-frequency components in the detection signal, for example in a range below 0.2 Hz, and to further process the low frequency components to derive signal features related to a mechanical behavior of the traffic infrastructure. Provided that the interrogator has suitable low frequency characteristics, in this way the optic sensor system serves a dual purpose. The low frequency behavior for example can provide information about road recovery, the extent to which the traffic infrastructure elastically responds to deformations incurred by the mechanical load of vehicles.

In a further elaboration of this embodiment the interrogator is configured to decompose the low-frequency components into first and second subcomponents, the first subcomponents being in a lower frequency range than said second subcomponents, wherein the interrogator is configured to further process the first subcomponents to derive signal features related to a mechanical behavior of the traffic infrastructure and to further process the second subcomponents to derive signal features related to a static load of the traffic infrastructure. For example signal features related to a static load of the traffic infrastructure may indicate a static load of vehicles on a parking lot or waiting for a traffic light.

In a further elaboration, that optionally may be combined with the previously mentioned elaborations, the interrogator is configured to identify first and second high frequency subcomponents within said high frequent components in the detection signal, wherein the second high frequency subcomponents are within a frequency range that is higher than a frequency range of said first high frequency components, the interrogator being configured to further process the first high frequency components to derive signal features related to traffic carried by the traffic carrying surface and to further process the second high frequency subcomponents to output an infrastructure condition signal related to a magnitude of said second high frequency subcomponents. The presence of second high frequency subcomponents with a high magnitude may be indicative of damages in the infrastructure.

In an embodiment the interrogator includes a conversion module to convert an optic response signal into a detection signal having a magnitude indicative for a detected strain of the at least one optic strain sensor element, and wherein the interrogator is configured to determine a change of amplitude in a temporal pattern of the detection signal and to estimate a viscoelastic state of the road using a model that relates said temporal pattern to the viscoelastic state. For example if the viscoelastic state of the traffic infrastructure is characterized by a high stiffness, the amplitude will more rapidly fall to zero than in case of a lower stiffness.

Also other means may be employed to monitor the state of the infrastructure. For example an acceleration sensor may be mechanically coupled to the traffic infrastructure and a signal processing module that is configured to identify a high frequent component in an output signal provided by the acceleration sensor may output an infrastructure condition signal related to a magnitude of said high frequency component. As in the embodiment wherein the interrogator is configured to identify second high frequency subcomponents, referred to above, the detection of the high frequency component may signal the presence of damages in the infrastructure. One or more acceleration sensors may be used as an alternative way to detect high frequency components as an indicator of infrastructure damage, but alternatively they may be used in combination with the above-mentioned embodiment wherein the interrogator detects these components in the optic response signals.

In an embodiment the interrogator is configured to process the response optic signal of each optic strain-sensor element in accordance with a specific viscoelastic state of the traffic infrastructure in the neighborhood of said each optic strain-sensor element and to compensate for mutual differences in viscoelastic state in the respective neighborhoods of optic strain-sensor elements. In this way reliable information about passing by traffic can be obtained that is not biased by the local mechanical properties of the sensor. In an example of this embodiment the viscoelastic state in a neighborhoods of an optic strain-sensor element is estimated using one or more of the measures presented above, e.g. by monitoring a change of amplitude in a temporal pattern of the detection signal. Alternatively or in addition it may be considered to analyze differences in response signals obtained from subsequent sensors in the longitudinal direction of the road. If systematic deviations are observed, this is an indication of mutually different local visco-elastical properties, and the determined values for the systematic deviations may be used to compensate further results.

Alternatively, or in addition, the interrogator may be configured to process the response optic signal of each optic strain-sensor element in accordance with a specific geometrical configuration of the traffic infrastructure in the neighborhood of said each optic strain-sensor element and to compensate for mutual differences in geometrical configuration in the respective neighborhoods of optic strain-sensor elements.

In practice the strain in a sensor is influenced not only by a load of conveyance elements not only directly above the sensor, but also at larger distances, and also by long range effects of other vehicles. In an embodiment the interrogator includes a conversion module to convert an optic response signal into a detection signal having a magnitude indicative for a detected strain of the at least one optic strain sensor element and further the interrogator is configured to use information about a relative position of a conveyance element to decompose a response optic signal into a signal component contributed to by that conveyance element and a remainder signal component not contributed to by that conveyance element. In addition or alternatively, the interrogator may be configured to use the information about the relative position of the conveyance element to decompose a response optic signal into a signal component contributed to by that conveyance element at a point in time and a remainder signal component not contributed to by that conveyance element at that point in time. This can be considered as a temporal deconvolution. In an example, information about a relative position of a conveyance element may be obtained using the measure specified above, using a model that relates the response optical signal to the relative position. Also the position may be estimated with other means, e.g. using a camera, optic sensors or by prediction from previous measurements.

In an embodiment the optic sensor system may comprise at least one further fiber optic sensor, and the interrogator may be configured to correlate a first response optic signal of the at least one fiber optic sensor with a second response optic signal of the at least one further fiber optic sensor to isolate a common signal pattern within said first and said second optic response signal. This allows tracking of a vehicle by its specific load distribution.

In an embodiment a plurality of optic strain-sensor elements are provided that are distributed in a longitudinal direction of the road, and the interrogator is configured to track motion of a vehicle in said longitudinal direction by associating subsequent response optic signals from respective ones of said optic strain-sensor elements associated with a traversal of said vehicle, to determine a magnitude of these subsequent response optic signals, therewith obtaining a time series of magnitudes and to determine whether an oscillation is present in said time series. If the vehicle is stable, variations in the magnitude of these subsequent response optic signals are absent or negligible. However, if this is not the case, for example because a vehicle is tilting in a bend of the road, or because the vehicle is oscillating this becomes apparent from such variations. These may be monitored by a traffic controller who in turn can take measures to avoid accidents.

The skilled person will appreciate that the magnitude might provide tracking data of the vehicle from a transverse sensor station to detect and characterize said date accurately, when the vehicle is in motion. This enables the possibility to elaborate 2-D mapping of vehicles in a road segment, including identification of traffic flow changes (e.g. traffic jams), accidents, et cetera.

In an embodiment of the invention, the fiber optic sensor may be based on acoustic or vibrational sensing, allowing an alternative or supplementary sensor means. The skilled person will appreciate that the acoustic and/or vibrational sensor can be placed at intervals.

In an example of the embodiment, the at least one fiber optic sensor is one of a plurality of fiber optic sensors that are arranged at mutually different longitudinal positions transverse to a longitudinal direction of the road, and wherein the plurality of optic strain-sensor elements that are distributed in a longitudinal direction of the road comprise optic strain-sensor elements of respective ones of said plurality of fiber optic sensors. In another example, the at least one fiber optic sensor extends in a longitudinal direction of the road.

In a further embodiment, the interrogator includes a signal analysis module for estimating properties of noise present in the response optic signal and a signal filter module to adaptively filter the response optic signal based on the estimation of said properties.

Additional sensors may be provided in combination with the optic sensor system presented above. For example one or more optical sensors may be provided for sensing objects present on the traffic infrastructure surface. A data integration module may be provided to combine output data from the interrogator and the one or more optical sensors. As another example a temperature estimation module may be provided to estimate a value for a temperature of an optic strain-sensor element. A compensation module may use said estimated value to compensate a response optic signal received from the optic strain-sensor element for temperature.

BRIEF DESCRIPTION OF THE DRAWINGS

These and other aspects are described in more detail with reference to the following drawings. Therein:

FIG. 5 shows additional details of an experimental implementation of the first embodiment, FIG. 6 shows exemplary reflection spectra of a fiber optic sensor used in this experimental implementation, FIG. 7a shows the peak shift as function of time for respective optic strain-sensor elements of the left-most fiber optic sensor of FIG. 5, FIG. 7b shows the peak shift as function of time for respective optic strain-sensor elements of the one but left-most fiber optic sensor of FIG. 5, FIG. 8 shows in a color coded two-dimensional plot a response measured for the leftmost fiber optic sensor as a function of time and of position in the lateral direction, FIGS. 9a,b and 10a,10b show results obtained in a second measurement session performed for a passing-by private car, therein FIG. 9a shows the peak shift as function of time for respective optic strain-sensor elements of the leftmost fiber optic sensor of FIG. 5, FIG. 9b shows the peak shift as function of time for respective optic strain-sensor elements of the one but left-most fiber optic sensor of FIG. 5.

DESCRIPTION OF EMBODIMENTS

Figure 1:
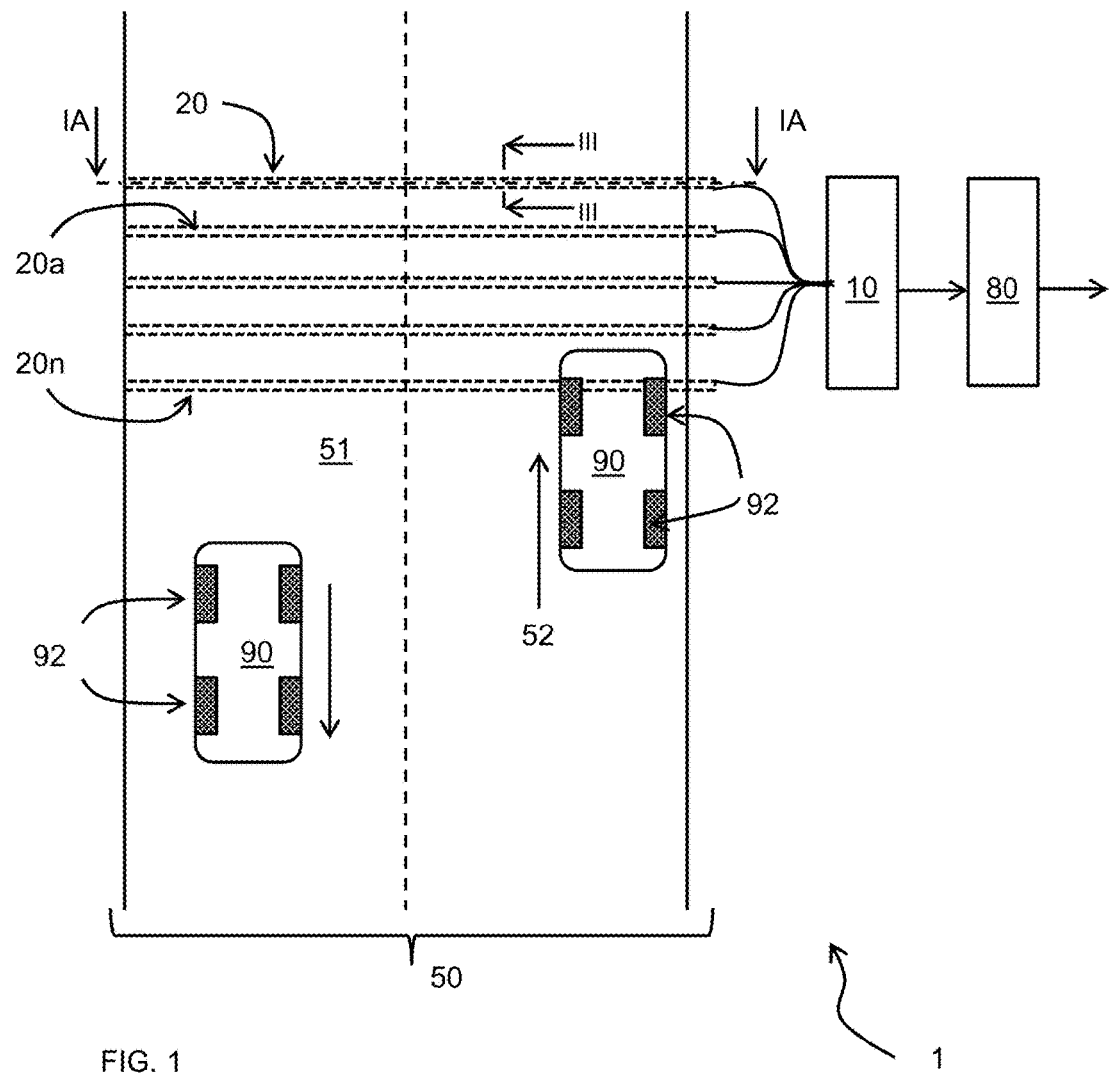
FIG. 1 schematically shows a first and second embodiment of an arrangement of a traffic infrastructure and an optic sensor system.

FIG. 1 schematically shows an arrangement 1 of a traffic infrastructure 50 and an optic sensor system 10, 20. The traffic infrastructure 50 has a traffic carrying surface 51 for providing support of conveyance elements 92 of a vehicle 90, therewith allowing movements of the vehicle over the traffic carrying surface 51. In the example shown the traffic infrastructure is a two-lane road, but alternative road types, e.g single lane roads, highway roads, cycle paths may be contemplated. In again other embodiments the traffic infrastructure is a track, like a railway track. Typically the conveyance elements 92 are wheels, such as the wheels of a car or a train. However, the arrangement is equally suitable for vehicles having other types of conveyance elements, like caterpillar tracks or the runners of a sleigh.

The optic sensor system 10, 20 comprises an interrogator 10 and at least one fiber optic sensor 20 coupled to the interrogator. The at least one fiber optic sensor 20 extends below the traffic carrying surface, preferably in a direction transverse to a longitudinal direction 52 of the traffic infrastructure, as illustrated in FIG. 1. Nevertheless the at least one fiber optic sensor 20 may alternatively extends in another direction. The at least one fiber optic sensor 20 may be one of a plurality of fiber optic sensors e.g. 20a, . . . ,20n, which may be arranged parallel to each other, as shown in FIG. 1. Alternatively, fiber optic sensors of a plurality of fiber optic sensors may have mutually different directions. As shown in more detail in FIG. 2, the at least one fiber optic sensor 20 comprises an optic fiber 21 with a plurality of optic strain-sensor elements 22 distributed over its length. In one embodiment the spacings between the plurality of optic strain sensitive elements is almost the same. In an another embodiment, the density of sensing elements is varying along the length of the fiber such that sensing elements are more closely spaced in some parts of the fiber (e.g. near the edges of the lane where the tyres can be anticipated to be) and less densely in other locations (e.g. the centres of the lane), to gain more reliable and accurate data from the tyre loads on the road. The plurality of optic strain-sensor elements 22 have mutually different optical characteristics. In particular the plurality of optic strain-sensor elements 22 have mutually different optic characteristics in that they have mutually different unconstrained reflection peaks or mutually different unconstrained absorption peaks. The wording "unconstrained" is used here as meaning the condition wherein the surface of the traffic infrastructure is unloaded. The interrogator 10 is configured to transmit an optical interrogation signal of a variable wavelength into the at least one fiber optic sensor, to receive a response optical signal that has been modulated by the fiber optic sensor based on its optical characteristics, and to identify changes in the optical characteristics of the response optical signal resulting from strains induced in the optic strain-sensor elements as a result of a conveyance element 92 of a vehicle moving over the traffic carrying surface 51 across the at least one fiber optic sensor. The interrogator is further configured to derive a set of signal features indicative for a shape of a temporal pattern of the response optical signal. The optic strain-sensor elements 22 for example are Fiber Bragg Gratings (FBG). However, also other optic strain sensitive elements are applicable, such as for example fiber lasers, interferometers formed using (non-strained) FBGs or using alternative methods. The optic sensor system further includes a preprocessor 80 coupled to an output of the interrogator 10 to receive sensed data from the interrogator. The preprocessor renders preprocessed data from this sensed data to be transmitted to a central server.

Figure 1A:
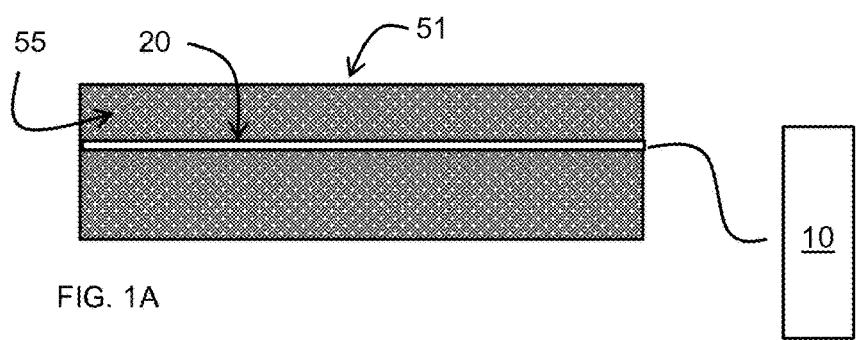
FIG. 1A shows a cross-section according to IA-IA in FIG. 1.

FIG. 1A shows a cross-section through the traffic infrastructure 50 according IA-IA in FIG. 1. In FIGS. 1 and 1A, it can be seen that the at least one fiber optic sensor 20 extends at least substantially according to a straight line in a direction that is at least substantially parallel to the traffic carrying surface 51. A fiber optic sensor is considered to extend substantially according to a straight line if at least its portion embedded in the infrastructure nowhere has a radius of curvature less than 5 m. Preferably the radius of curvature is nowhere less than 20 m. As the at least one fiber optic sensor 20 extends at least substantially according to a straight line optical losses therein are extremely low, and the lifetime of the fiber optic is increased, thereby mitigating maintenance and recalibration requirements.

In some embodiments, an external portion of the optic fiber, i.e. extending outside the traffic infrastructure may have a smaller radius of curvature, for example to facilitate connection with other elements. An external portion can be replaced more easily than an internal portion, i.e. embedded in the traffic infrastructure so that a modest risk of failure may be acceptable.

A fiber optic sensor may be considered to extend at least substantially parallel to the traffic carrying surface 51 if its distance to a plane defined by the traffic carrying surface 51 does not vary by more than 30%. In other words a depth of a fiber optic sensor may vary between D−0.15*D and D+0.15*D, wherein D is the average value of the depth. Preferably the depth variations are even less than 20% or more preferably less than 10%.

Figure 2:
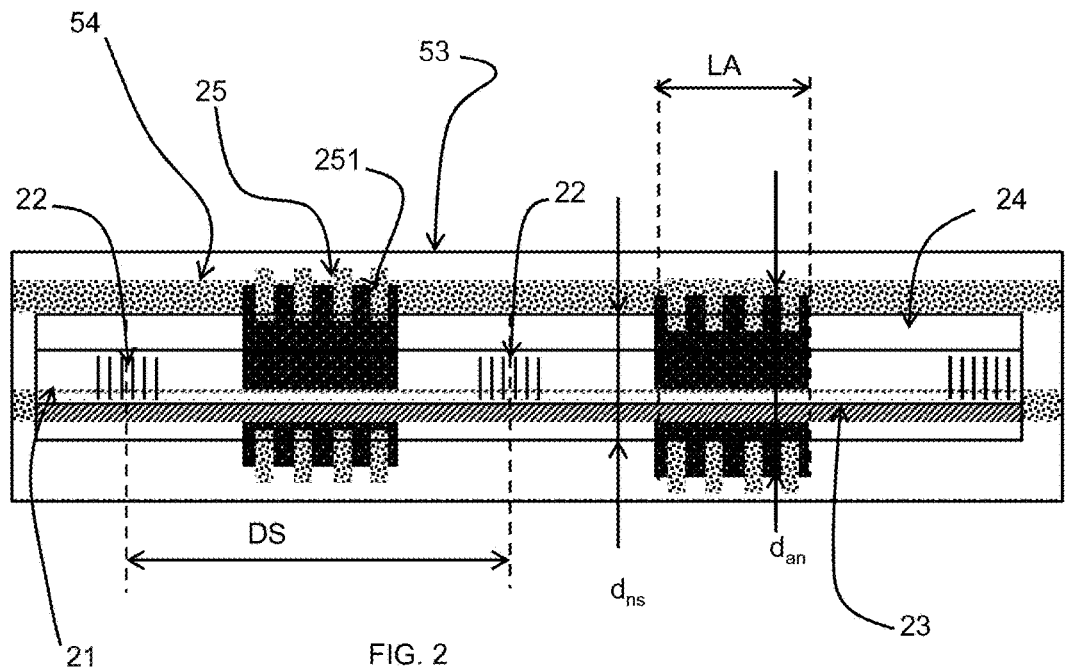
FIG. 2 shows a portion of an embedded fiber optic sensor in more detail.

As shown in more detail in FIG. 2, the at least one fiber optic sensor 20 is provided with at least one anchor element 25 that extends around the at least one fiber optic sensor between mutually subsequent optic strain-sensor elements 22. The at least one anchor element 25 has a circumference in a plane transverse to a longitudinal direction of the at least one fiber optic sensor 20 that is at least 1.5 times larger than a circumference of the fiber optic sensor in a plane transverse to said longitudinal direction at a position of an optic strain-sensor element. The circumference of an anchor element may for example be in a range of 5 to 30 times a circumference of the fiber optic sensor. The at least one anchor element 25 provides for a strong longitudinal coupling of the at least one fiber optic sensor 20 with the carriageway. In the embodiment shown an anchor element is provided between each pair of subsequent optic strain-sensor elements 22. The anchor elements 25 may have a length LA in the range of 0.1 to 0.7 times a distance DS between said mutually subsequent optic strain-sensor elements 22. In the example shown mutually subsequent optic strain-sensor elements 22 are spaced at a distance DS of 5 to 20 cm and the anchor elements 25 between them have a length LA of a few cm, for example 2 to 5 cm. In this way a relatively high sensitivity is preserved in the optic strain-sensor elements 22, while providing a strong anchoring and coupling to the road layers. A still improved anchoring of the fiber optic sensor 20 is obtained in that the anchor elements 25 are provided with tangentially extending grooves 251.

In the embodiment shown, the fiber optic sensor 20 has a non-slip coating 24 that surrounds the optic fiber 21. The non-slip coating 24 determining the outer surface of the fiber optic sensor between the anchor elements has a diameter $d_{ns}$ in the range 1-3 mm. The anchor elements may have a diameter $d_{an}$ in the range of 5-15 mm. The non-slip coating even further improves a mechanical contact with the traffic carrying layer 55 of the infrastructure wherein the optic fiber is embedded. The non-slip coating 24 in addition reinforces the optic fiber, while preserving a high resolution with which mechanic deformations can be detected. Good results can be achieved with a non-slip coating having an outer diameter in the range of 2 to 20 times an outer diameter of the optic fiber 21. By way of example the fiber optic sensor 20 may have an optic fiber with a diameter of about 0.15 mm that is provided with a non-slip coating having an outer diameter of about 1-3 mm. In the embodiment shown in FIG. 2 the non-slip coating 24 is made of a glass-fiber reinforced polymer (GFRP). An intermediate layer 23 (e.g. of a polyimide), can be arranged between the optic fiber 21 and the non-slip coating 24 for a better adherence between the latter two elements and for protection of the glass-fiber during production processes.

Figure 3:
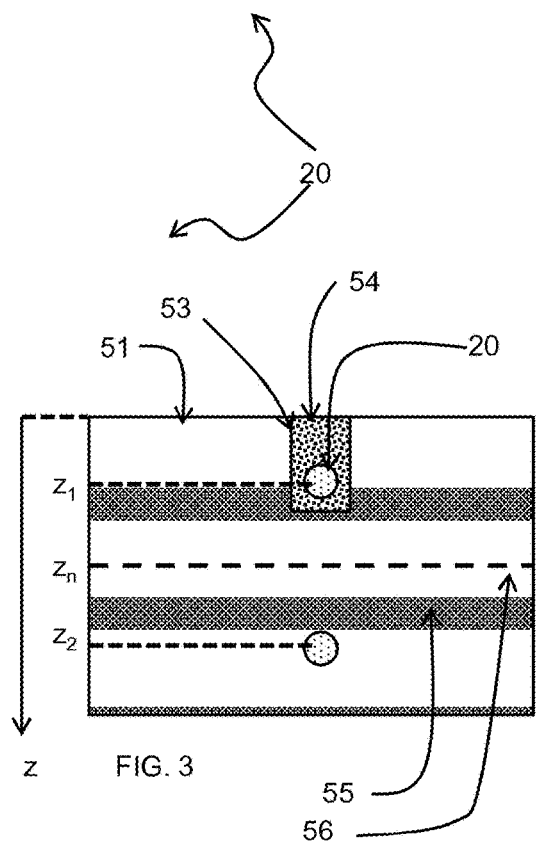
FIG. 3 shows a cross-section through the traffic infrastructure, according to III-IIIV in FIG. 1, FIG. 4a schematically shows a temporal signal pattern $\Delta\lambda(t)$ of a single optic strain-sensor element upon traversal of a vehicle's conveyance element, FIG. 4b schematically shows a temporal signal pattern $\Delta\lambda(t)$ of a single optic strain-sensor element in the time-window corresponding to the traversal of the vehicle, FIG. 4c schematically shows a response for all optic strain-sensor elements in a single fiber optic sensor in said time window.

Depending on the circumstances various options are possible to integrate one or more fiber optic sensors 20 in the infrastructure 50. When constructing a new road or during substantial maintenance and restoration activities of an existing road, the fiber optic sensors 20 may be arranged between a support layer and a traffic carrying surface 51 carried by the support layer. In this way only a modest effort is required to provide the arrangement. In other cases, as illustrated in FIG. 3, a fiber optic sensor 20 may be arranged in a trench 53 inside a traffic carrying layer 55 defining the traffic carrying surface 51. For this purpose a relatively narrow trench 53, e.g. having a width of a few cm suffices. After the fiber optic sensor 20 is arranged therein, the trench 53 can be filled with a filler material 54, like asphalt or bitumen. In a particular embodiment, the traffic carrying layer 55 may comprise a set of sub-layers, and a fiber optic sensor 20 may be arranged in at least one of such sub-layers, preferably, not on the sub-layer closest to the traffic carrying surface 51.

It has been found that the traffic infrastructure typically has a neutral axis 56. At the depth of the neutral axis traversing traffic substantially causes no strain in a direction transverse to the longitudinal direction of the infrastructure. The fiber optic sensor 20 should be arranged at a depth $z_1$, $z_2$ that is sufficiently spaced from a depth $z_n$ of the neutral axis 56 of the traffic infrastructure 50. The depth $z_n$ of the neutral layer 56 may vary from case to case, and its precise depth value may be estimated using a model calculation or may be measured.

Depending on the materials used for the traffic infrastructure, the neutral axis may for example be at a depth in the range of 5 to 20 cm with respect to the traffic carrying surface 51. If the fiber optic sensor 20 is arranged at a depth $z_1$ over the depth $z_n$ of the neutral axis 56, the depth $z_1$ is preferably greater that 2 cm, preferably greater than 5 cm. This is advantageous, in that during maintenance of the road, the upper surface can be removed without damaging the fiber optic sensor 20. If the fiber optic sensor 20 is arranged below the neutral axis 56, the depth $z_2$ is preferably not too great as the spatial resolution of the measurements can gradually decrease with depth. Good results may for example be obtained if a fiber optic sensor 20 below the neutral axis 56 is arranged at a depth of 1.5 to 2 or 3 times $z_n$.

It should be noted that sensors above and below the neutral axis 56 are not exclusive to one another, therefore, good results can also be achieved by implementing a series of sensors over the neutral axis 56 and/or another series of sensors below the neutral axis 56.

It may also be contemplated to configure the interrogator to derive a set of signal features by using a model that relates properties of conveyance elements and or its kinetic state to a shape of the temporal pattern, as is set out below.

Figure 4A:
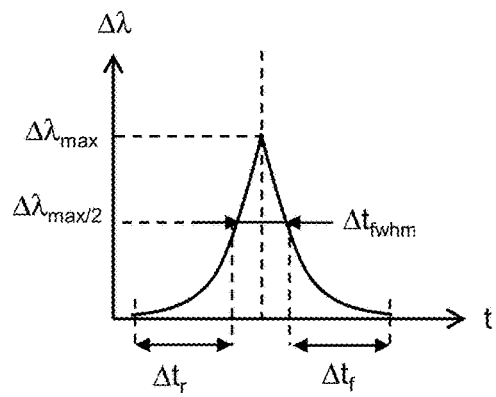

FIG. 4a schematically shows a temporal signal pattern $\Delta\lambda(t)$ for an optic strain-sensor element occurring when a tire of vehicle traverses the traffic carrying surface 51 above it. The temporal signal pattern $\Delta\lambda(t)$ has a substantially symmetrical shape. Exemplary shape parameters are its height ($\Delta\lambda_{max}$) and its width e.g. specified by its full-width half maximum ($\Delta t_{fwhm}$).

The height $\Delta\lambda_{max}$ is indicative for the pressure exerted by the tire on the road surface, which in its turn is determined by the portion of the weight of the vehicle carried by that tire and the dimensions of the tire. The width of the temporal signal pattern depends on the characteristics of the tire and the speed of the vehicle, the traffic carrying layer 55 and the support layer (if such layer is provided).

Even further information may be retrieved from the temporal signal pattern by analysis of slight asymmetries, e.g. between a rise time $\Delta t_r$ and a fall time $\Delta t_r$. Also the lapse of time between the left half maximum to the peak of the temporal signal pattern, and the lapse of time between the peak of the temporal signal pattern and the right half maximum may be determined separately.

The shape of the temporal pattern associated with a single tire of a vehicle traversing the traffic infrastructure may already be indicative for the type of vehicle. For example the pressure exerted by the tire as indicated by the height $\Delta\lambda_{max}$ of the peak of the temporal signal pattern $\Delta\lambda(t)$ may already indicate a weight class of the vehicle. For example it may indicate whether the vehicle is a truck or passenger car. Furthermore, the temporal signature of the tyre can be indicative of the contact surface area of the tyre with the road if the speed of the vehicle is determined from the other parameters.

Figure 4B:
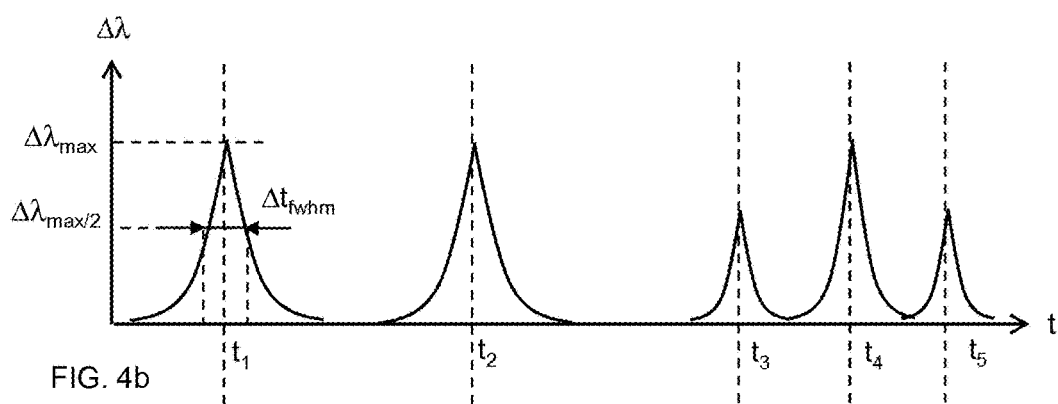

Using also the global aspects of the shape of the temporal pattern associated with the traversal of a vehicle renders it possible to retrieve more detailed and more accurate information, as is set out with reference to FIG. 4b. FIG. 4b schematically shows a temporal signal pattern $\Delta\lambda(t)$ for an optic strain-sensor element for the full time-window wherein the vehicle traverses the traffic carrying surface 51 above it.

The complete temporal pattern in this case includes 5 peaks, one for each tire of the vehicle on its side above that optic strain-sensor element.

One global aspect of the shape is the number of peaks in the temporal pattern, five in this case. Furthermore the weight distribution of the vehicle may be inferred from the relative heights of the peaks.

Other aspects that can be retrieved are for example relative time intervals determined between peaks in the temporal pattern.

For example the following relative measures $\alpha_1$, $\alpha_2$, and $\alpha_3$ may be determined.

$$\alpha_1 = \frac{t_3 - t_1}{t_2 - t_1}, \alpha_2 = \frac{t_4 - t_3}{t_2 - t_1}, \alpha_3 = \frac{t_5 - t_4}{t_2 - t_1}$$

These measures are indicative for the dimensions of the vehicle but independent of the speed of the vehicle. Alternatively, if the speed of the vehicle is estimated with other means, the absolute dimensions of the vehicle can be determined, i.e. the distances between each pair of axles.

The interrogator 10 may be further configured to mutually correlate signal features obtained from a plurality of conveyance elements of a vehicle and to use said mutually correlated signal features to estimate properties of said vehicle.

Figure 4C:
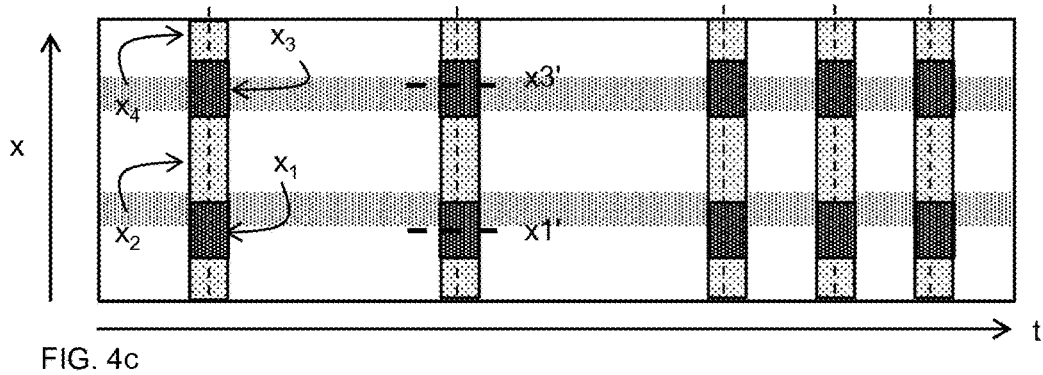

For example, results obtained from a plurality of optic strain-sensor elements may be combined to derive further information, as is illustrated in FIG. 4c. FIG. 4c schematically shows a response for all optic strain-sensor elements in a single fiber optic sensor. Therein the horizontal axis, which indicates the measurement time, corresponds to the horizontal axis of FIG. 4b. The vertical axis indicates the position of the optic strain-sensor elements in the longitudinal direction of the fiber optic sensor, i.e. in this case the position transverse to the longitudinal direction of the road. The response of the sensors is schematically illustrated by a hatching. A dark hatching indicates an increase of the peak wavelength and a light hatching indicates a decrease of the peak wavelength or negligible change.

In the illustration of FIG. 4c the optic strain-sensor elements arranged around positions x1 and x3 show an increase of their peak wavelength in a time-interval centered around t1, due to the first pair of tires traversing the road above the fiber optic sensor wherein they are arranged. In the same time interval the optic strain-sensor elements arranged in in-between positions, e.g. around x2 show a decrease of their peak wavelength due to a compressive stress, albeit at lower amplitude. Likewise optic strain-sensor elements laterally arranged e.g. at x4 with respect to the trajectory followed by the vehicle, show a decrease of their peak wave length in that time interval. The same pattern is repeated for the time-intervals centered around t2, t3, t4 and t5 corresponding to the time-intervals where the other pairs of tires traverse the road above the fiber optic sensor.

The pattern so obtained (e.g. as represented in FIG. 4c) by the interrogator can be interpreted to represent a spatial pattern wherein the vertical axis (X) indicates the lateral dimensions of the vehicle and wherein the horizontal axis (t) (the time delay between measurements) indicates longitudinal dimensions defined by the product of the speed of the vehicle and the difference in time for the detected features. Hence, the pattern can be considered as a spatial footprint of a plurality of tires of a vehicle. In particular the spatial footprint indicates a position of the conveyance elements of the vehicle relative to each other. In addition, the spatial footprint may indicate a pressure exerted by the individual conveyance elements of the vehicle, i.e. tires exerting a higher pressure cause a larger shift in the characteristic wavelength of a sensor element.

In the embodiment shown the optic strain-sensor elements are arranged at a distance of 10 cm with respect to each other in the longitudinal direction of the fiber optic sensor. This renders it possible to accurately estimate the position of the tires of a vehicle in the lateral direction of the road. This also facilitates a measurement of the distance between tires on the same axle of the vehicle.

The spatial information obtained in this way can further be used for identifying the vehicle and for demultiplexing detected optical signals in case of high density traffic. For example, upon identifying at point in time t2 the increase of peak wavelength for the optic strain-sensor elements centered around x1' and x3', it is more likely that these observations result from the same vehicle if the values for x1' and x3' are substantially the same as those for the x1 and x3 respectively than in case there is a substantial difference.

Instead of only using the sensed optical signals of the sensor elements that are most directly affected by the traversing vehicle, here the sensor elements arranged near positions $x_1$ and $x_3$, it is alternatively possible to process the entire spatial response pattern resulting from the set of optic strain-sensor elements in a fiber optic sensor. I.e. at each point in time, the set of optic strain-sensor elements provides a spatial signal pattern $\Delta\lambda(x)$, where x is the position of each optic strain-sensor element. The spatial signal pattern $\Delta\lambda(x)$, can for example be provided to a trained neural network. The latter may for example be trained to indicate one or more of a class of vessel, a lateral position of the vessel, loading asymmetries etc.

According to another approach the interrogator is configured to compare the temporal pattern of the detected optical signal with respective stored temporal patterns and to provide an output signal indicative for the stored temporal pattern that best matches the detected optical signal as a signal feature indicative for the shape of the temporal pattern of the detected optical signal.

Alternatively, the interrogator can be configured to apply curve-fitting algorithms, i.e., to derive the set of signal features by using a model that relates properties of said conveyance element and or its kinetic state to a shape of the temporal pattern and only store the essential signal features to be able to replicate the measurements as a function of these essential signal features.

Experimental Set Up

Experiments were conducted with an experimental implementation of the first embodiment as shown in FIG. 5. The arrangement comprises four fiber optic sensors 20a, 20b, 20c, 20d that are embedded in a road with traffic carrying surface 51. The road has a longitudinal direction indicated by arrow 52. The four fiber optic sensors 20a, 20b, 20c, 20d extend transverse to this direction, i.e. in the lateral direction of the road. The leftmost fiber optic sensors 20a, 20b are embedded close to each other, at a depth of 6 cm below the traffic carrying surface 51 and the rightmost fiber optic sensors 20c, 20d are embedded close to each other, at a depth of 11 cm below the traffic carrying surface 51. The neutral axis of the road used for these experiments was calculated at a depth of about 8.5 cm.

The two rightmost fiber optic sensors 20c, 20d are arranged at a distance of 1.5 m from the two left-most fiber optic sensors 20a, 20b. The fiber optic sensor 20a has a first longitudinal portion extending from 0.8 to 4 m from the side of the road that is provided with optic strain-sensor elements. In FIG. 5, a first side of the road having D<4 m is indicated with reference 51A. A second side of the road having D>4 m is indicated with reference 51B. The fiber optic sensor 20b has a second longitudinal portion extending from 4 m from the side of the road to the opposite side of the road provided with optic strain-sensor elements. The fiber optic sensor 20c has a second longitudinal portion extending from 4 m from the side of the road to the opposite side of the road provided with optic strain-sensor elements. In one embodiment, the fiber optic sensor 20d has a first longitudinal portion extending from approx. 0.8 m to 4 m from the side of the road that is provided with optic strain-sensor elements. Each of the fiber optic sensors 20a, 20b, 20c, 20d has 30 fiber optic sensor elements spaced at regular intervals of 10 cm. FIG. 6 shows an exemplary reflection spectrum of one of the fiber optic sensors in a neutral, unstrained state. Each of the optic strain-sensor elements in the fiber optic sensors has a respective narrow reflection peak. The spectral spacing of these peaks in this example is about 1.2 nm. Occurrence of strain resulting from a vehicle moving on the traffic infrastructure across an optic strain-sensor element causes a shift of a peak wavelength (characteristic wavelength) of that sensor element.

The fiber optic sensors 20a, 20b, 20c, 20d are coupled to a fiber optic interrogator (sub-)system 10. In the embodiment used in the experimental set-up the FBG interrogator 10 has a measurement range of 40 nanometers with a recording speed of 1000 Hz and a wavelength tracking resolution of approximately 0.1 picometers.

Experimental Results

A first measurement session was conducted using a 5-axle truck. The truck was driven at a speed of about 30 km/h over the second side 51B of the road in a direction opposite to arrow 52.

Figure 7B:
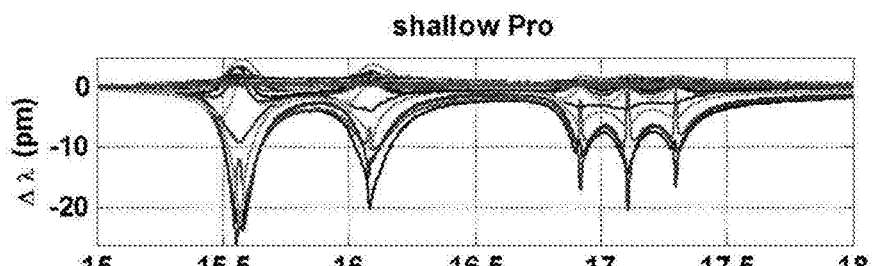
FIGS. 7a, 7b, and 8 shows results obtained in a first measurement session performed for a passing-by 5-axle truck, therein
Figure 7A:
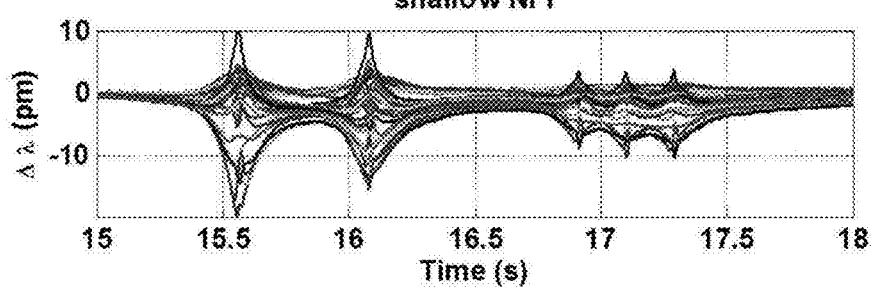

FIG. 7a shows the peak shift as function of time for respective optic strain-sensor elements of the left-most fiber optic sensor 20a of FIG. 5, measured in a time interval of 3 s, i.e. from t=15 s to t=18 s. The peak shift demonstrates a temporal pattern that is globally characterized by the presence of 5 extrema, and that is locally characterized by the shape of the peaks.

The optic strain-sensor elements, respond differently depending on their longitudinal position in the fiber optic sensor 20a relative to the lateral position of the conveyance elements (tires) of the vehicle. Dependent on the lateral position of the sensor elements in sensor 20a, the extrema of their individual response curve at point in time 15.6 s, corresponding to the traversal of the tires on the first axis have a value of about −20 pm to about +10 pm. The optic strain-sensor elements substantially below the passing by tires experience a tensile stress resulting in a temporal increase of their peak wavelength. The optic strain-sensor elements arranged between the passing by tires and those laterally arranged of the vehicle experience a compressive stress resulting in a temporal decrease of their peak wavelength.

FIG. 7b shows the peak shift as function of time for respective optic strain-sensor elements of the one but leftmost fiber optic sensor 20b of FIG. 5, measured in the same time interval. Upon traversal of the tires on the first axis the sensor elements in this sensor 20a have extrema with a value in the range of about −25 pm to about +3 pm.

Figure 8:
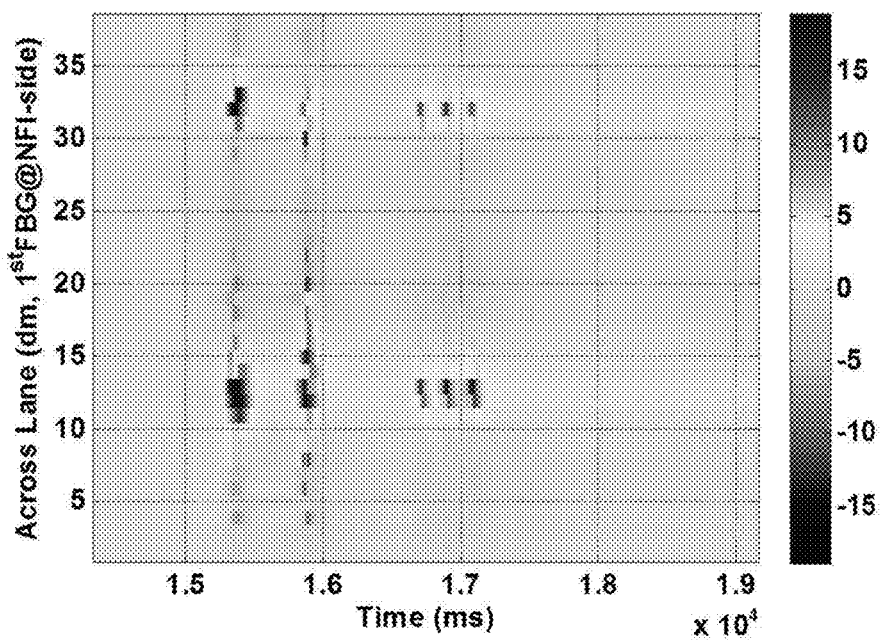

FIG. 8 shows in a color coded two-dimensional plot a response measured for fiber optic sensor 20c as a function of time (ms) and of position (dm) in the lateral direction. In this plot the deviations caused by the traversal of each pair of wheels of each of the five axles of the truck over the fiber optic sensor 20a are clearly visible. The traversal of the first pair of wheels is visible at a position of the horizontal axis for time t=15.4 s at a vertical position of approximately 1.25 m and 3.25 m respectively. The traversal of the next pairs of wheels follows at points in time 15.9, 16.7, 16.9 and 17.1 s, for the same respective vertical positions.

FIGS. 9a,b and 10a,b show results obtained in a second measurement session performed for a private car, a VW Golf, passing-by at 62 km/hr.

FIG. 9a shows the superposed response curves for the optic strain-sensor elements of the leftmost fiber optic sensor 20a of FIG. 5. Each response curve represents the change of peak wavelength in nm as a function of time in s. The response curves each have an extremum for t=4.75 s and for t=4.92 s. Dependent on the longitudinal position of the sensor elements in the sensor 20a, the extrema have a value in the range of −5 pm to 1 pm. For a first group CR1 of response curves, corresponding to the optic strain-sensor elements where the tires of the car traverse the sensor 20a, the extremum is a minimum. For the remaining group CR2 of optic strain-sensor elements the extremum is a maximum.

FIG. 9b shows the superposed response curves for the optic strain-sensor elements of the one but leftmost fiber optic sensor 20b of FIG. 5, which extends below the other half of the traffic infrastructure. No responses exceeding the noise level (having a magnitude of about 0.3 pm) were detected.

Figure 10A:
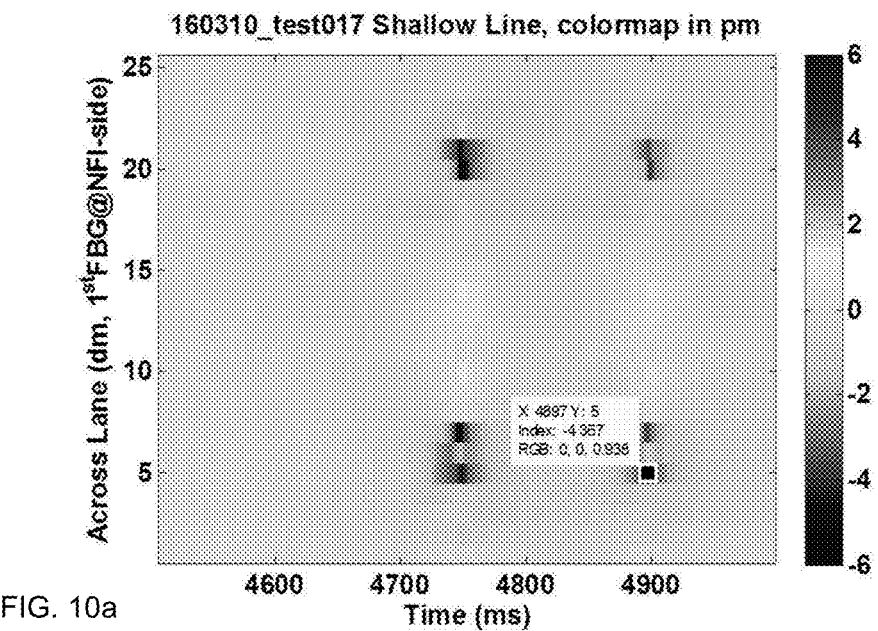
FIG. 10a shows in a color coded two-dimensional plot a response measured for the leftmost fiber optic sensor of FIG. 5 as a function of time and of position in the lateral direction.

FIG. 10a shows in a color coded two-dimensional plot a response measured for the leftmost fiber optic sensor 20a of FIG. 5 as a function of time and of position in the lateral direction. In this plot it is clearly visible that the optic strain-sensor elements located at a lateral position of about 0.6 m and about 2.1 m show the strongest response of about −5 pm.

Figure 10B:
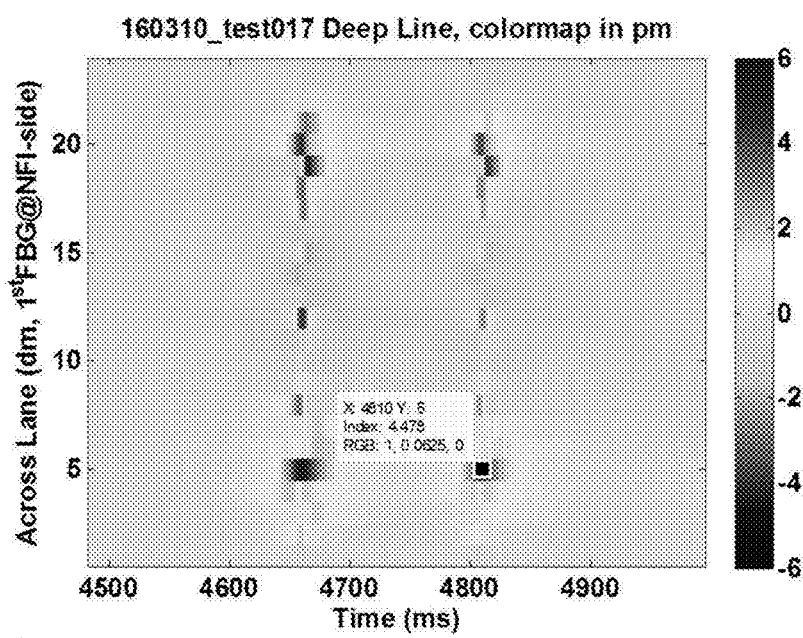
FIG. 10b shows in a color coded two-dimensional plot a response measured for the rightmost fiber optic sensor of FIG. 5 as a function of time and of position in the lateral direction, FIGS. 11 and 12a,b show results obtained in a third measurement session performed for a passing-by bicycle, therein

FIG. 10b shows in a color coded two-dimensional plot a response measured for the rightmost fiber optic sensor 20d of FIG. 5 as a function of time and of position in the lateral direction. Here the optic strain-sensor elements at the above-mentioned lateral position show a maximum deviation of about +3 pm for points in time 4.67 and 4.82 s.

Figure 11:
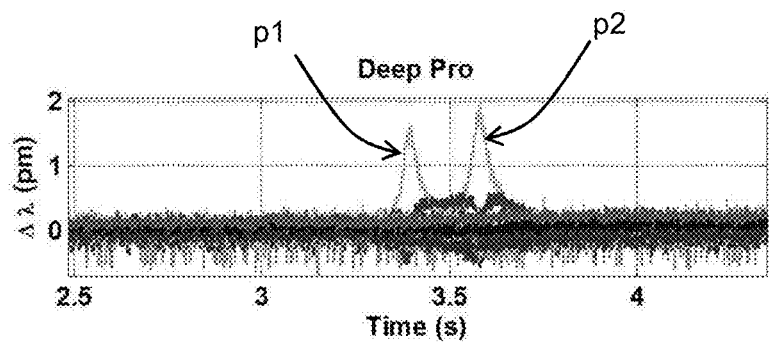
FIG. 11 shows the FBG peak shift as a function of time and distance in the direction transverse to the traffic direction for respective optic strain-sensor elements of the one but rightmost fiber optic sensor of FIG. 5.
Figure 12A:
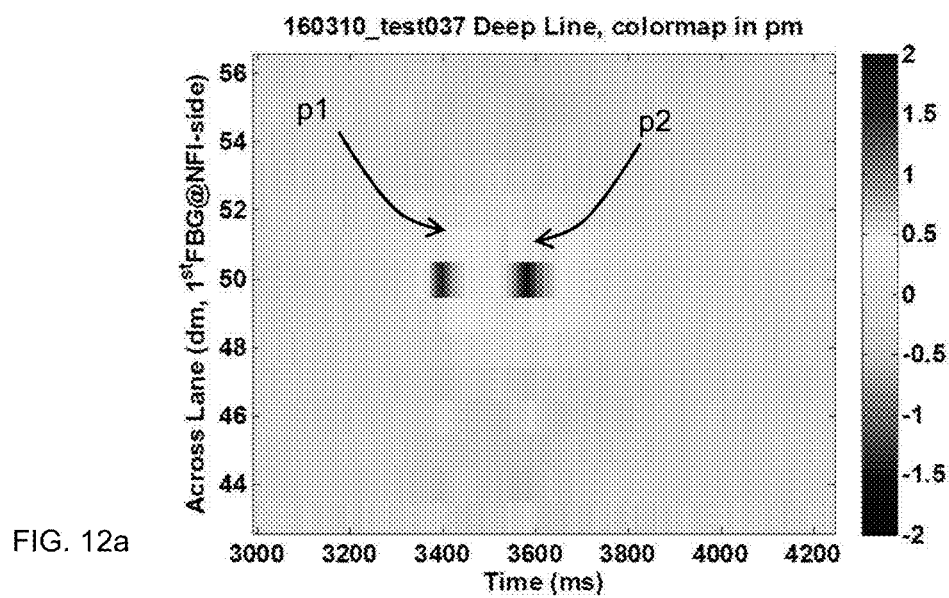
FIG. 12a shows in a color coded two-dimensional plot the response measured for the leftmost fiber optic sensor of FIG. 5 as a function of time and of position in the lateral direction.

FIGS. 11 and 12a,b show results obtained in a fourth measurement session performed for a bicycle traversing the fiber optic sensors of FIG. 5. FIG. 11 shows a superposition of the responses (the FBG peak shift) of the sensor elements of optic sensor 20d as a function of time. Again, the peaks p1, p2 in the response of the sensor element having the longitudinal position corresponding to the location where the bicycle traverses fiber optic sensor 20d are clearly visible.

Figure 12B:
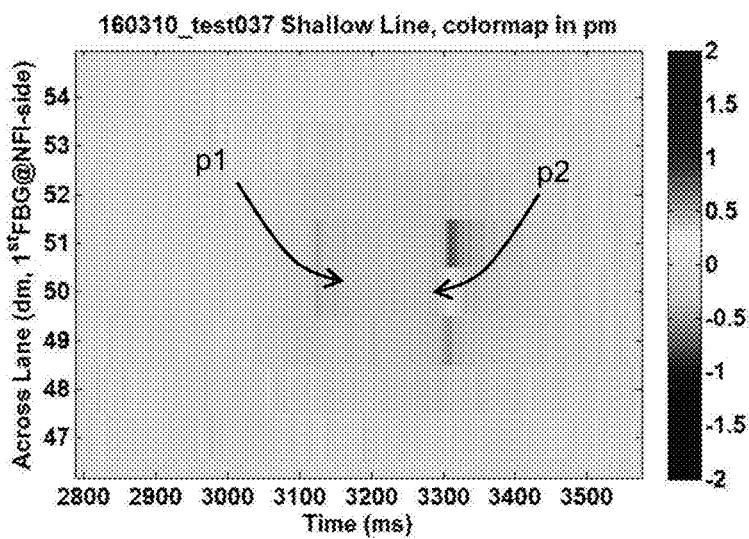
FIG. 12b shows in a color coded two-dimensional plot the response measured for the rightmost fiber optic sensor of FIG. 5 as a function of time and of position in the lateral direction, FIGS. 13A, 13b and 13c schematically summarize the results of the above-mentioned measurements.

FIG. 12a shows another representation of the response measured for fiber optic sensor 20d, i.e. as a color coded two-dimensional plot. Therein the color (or gray value) indicates the value of the response as a function of time (in ms) and of position (in dm) in the lateral direction of the infrastructure (longitudinal direction of the sensor 20d). Also in this plot the peaks p1, p2 are clearly visible at position coordinate 50 dm and time coordinates 3400 ms and 3600 ms respectively. FIG. 12b shows in a corresponding plot the response measured for fiber optic sensor 20a. This sensor 20a, which is arranged more shallow in the carriage way shows a negative response peak upon traversal of the bicycle.

Figure 13A:
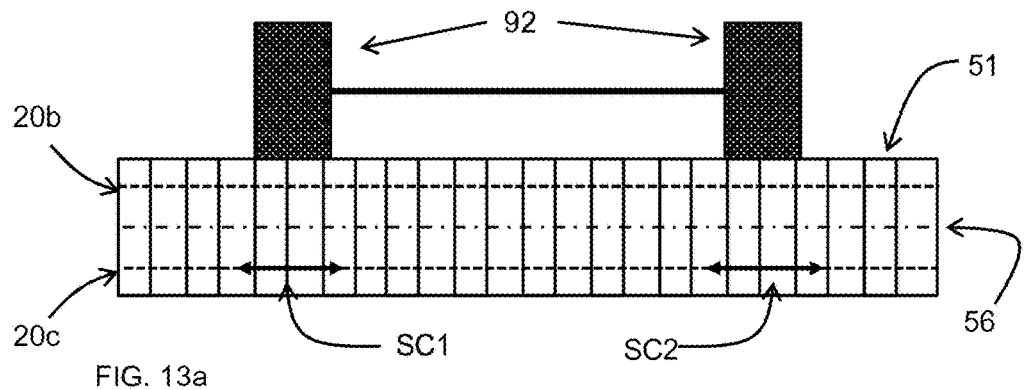
Figure 13B:
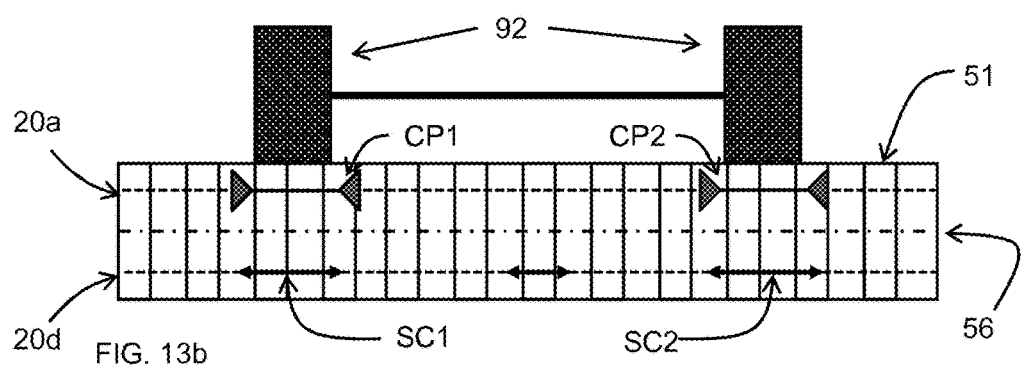
Figure 13C:
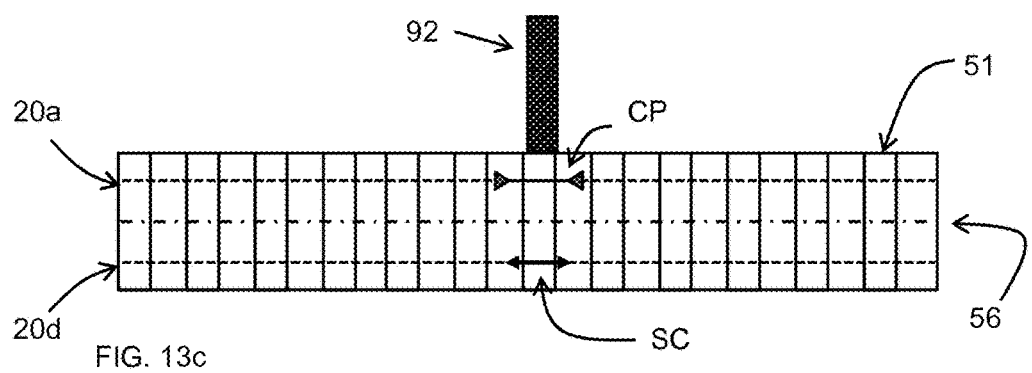

FIGS. 13a to 13c summarize the results obtained with the measurements presented above. FIG. 13a pertains to the measurements conducted with the 5-axle truck as described in more detail with reference to FIG. 7a,7b and FIG. 8. FIG. 13a schematically shows that the sensor elements of the sensor 20c arranged about 11 cm below the position where the tires 92 traverse the traffic carrying surface 51 show a positive peak of about 15 pm, i.e. an increase of about 15 picometer of the characteristic wavelength of these sensor elements. Accordingly the traversal of the tires of the vehicle at these positions causes a slight local stretch, indicated by arrow SC1, SC2 inside the traffic infrastructure. Due to the longitudinal coupling between the traffic infrastructure and the sensor 20c, which is facilitated in particular by the anchor elements 25, this local stretch can be measured as an increase in the characteristic wavelength of the relevant sensor elements.

FIG. 13b pertains to the measurements conducted with the private car as described in more detail with reference to FIG. 9a, 9b, 10a, 10b. In these measurements again a slight local stretch SC1, SC2 was observed at the positions relatively far below (i.e. below the neutral axis 56) the positions of traversal of the tires. In addition a slight local compression, as indicated by arrows CP1, CP2 was observed at the positions above the neutral axis 56 below the positions of traversal of the tires. Again the tight longitudinal coupling between the fiber optic sensors 20a, 20d enabled a measurement of these stretches SC1, SC2 and compressions CP1, CP2 as a shift of the characteristic wavelength of the relevant sensor elements.

FIG. 13c pertains to the measurements conducted with the bicycle as described in more detail in FIGS. 11, and 12a, 12b. Again as illustrated in FIG. 13c a compression could be measured at a relatively shallow level, i.e. above the neutral axis 56 and a stretch could be measured at a relatively deep level, i.e. below the neutral axis.

In summary, the measurement arrangement according to the present invention renders it possible to determine solely with optic means, and with a high accuracy, a large variety of measurement data relating to vehicles using the infra structure, such as data pertaining to vehicle speed, vehicle type, vehicle loading, vehicle loading asymmetries etc, but also to the infrastructure proper. For example, the occurrence of a systematic deviation of the characteristic wavelength of sensor elements of s sensor may indicate structural deformations of the road.

Nevertheless, the measurement arrangement may be extended with additional means to obtain additional measurement data.

Figure 14:
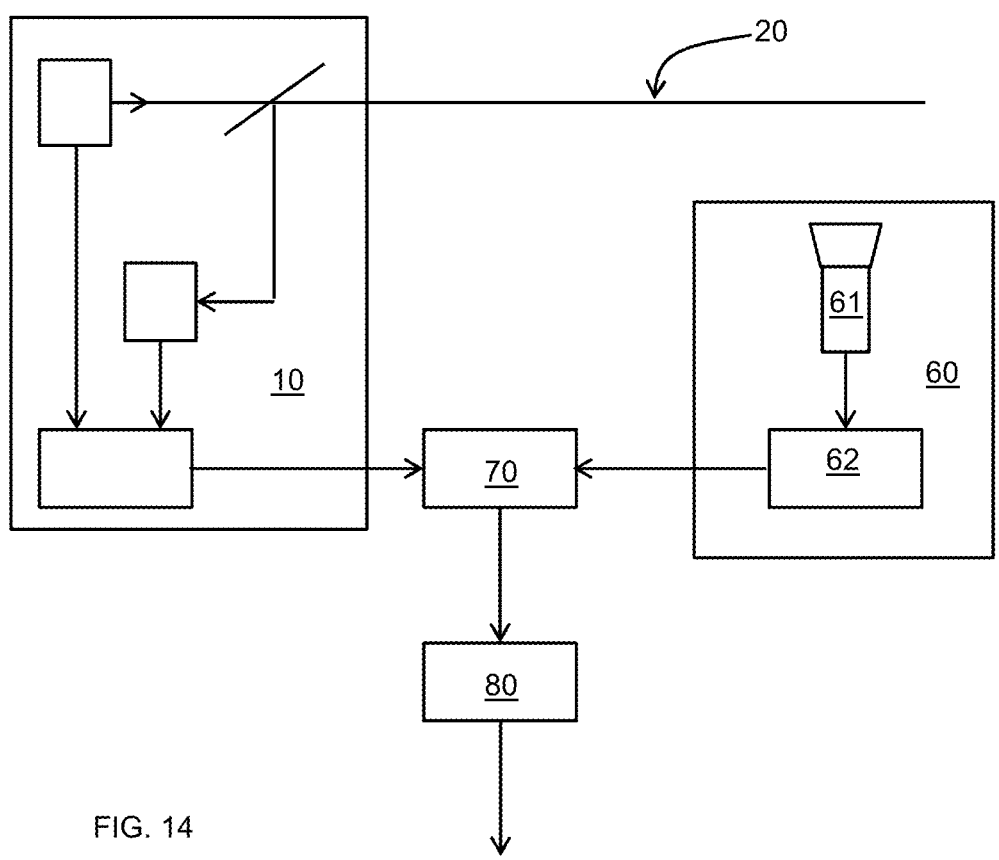
FIG. 14 shows a third embodiment of an arrangement of a traffic infrastructure and an optic sensor system.

By way of example, FIG. 14, shows an alternative arrangement, Therein the optic sensor system 10,20 may optionally be combined with a visual data acquisition system 60 using a data integration module 70. The visual data acquisition system 60 includes at least a camera 61 for monitoring traffic near the at least one fiber optic sensor. The camera may for example have a field of view extending from 10 m before the position where the fiber optic sensor 20 extends below the traffic carrying surface to 10 m beyond that position. The image processing system 62 provides output data indicative for sensed visual features monitored in the field of view of the camera. The data integration module 70 combines output data provided by the sensor system 10, 20 with output data provided by the visual data acquisition system 60. The data integration module 70 correlates the output data of these systems based on the time of occurrence of signal features in the output data. Upon detection that a limit is trespassed (such as e.g. a weight limit, speed limit and/or a number of axles of a vehicle) the data integration module may associate this detection with license plate information provided by the image processing system 62 for that point in time. It is not strictly necessary that the field of view of the camera overlaps the position of the fiber optic sensor 20. If the field of view of the camera is before or after the position of the fiber optic sensor, the data integration module 70 may compensate for the difference in time of acquisition of the output signals using the estimated speed of the vehicle. For example, the field of view may be any sub zone of a zone that extends over a distance of 100 m before to 100 m after that position, for example a subzone extending from 70 m before that position to 60 m before that position. Preferably however the field of view of the camera is near the position of the fiber optic sensor to mitigate any errors in the correlation of the output data of the systems due to changes in speed of a vehicle or changes of lane.

Additionally, the present invention can be used not only for accurate measurements of physical parameters such as speed or weight, it can also be used as a mechanism to detect the presence of a vehicle within an infrastructure thereby acting as a triggering mechanism for other type of devices, such as signaling devices, cameras, gates, etc.

It should be noted that the present invention envisages different embodiments that are particularly useful in different applications.

As an example in the case wherein the traffic infrastructure is a road (car, motorcycle or bike), it is particularly advantageous to use an arrangement according to the present invention in which the at least one fiber optic sensor (20) is arranged in a direction transverse to a longitudinal direction of the traffic infrastructure (50).

On the other hand, in the case wherein the traffic infrastructure is a rail track, it is particularly advantageous to use an arrangement wherein the fiber optic sensor (20) is arranged in a direction longitudinal along the direction of the traffic infrastructure (50). It is specially preferred that such sensor is located below the top surface of the rail track and attached thereto.

Figures 15A, 15B:
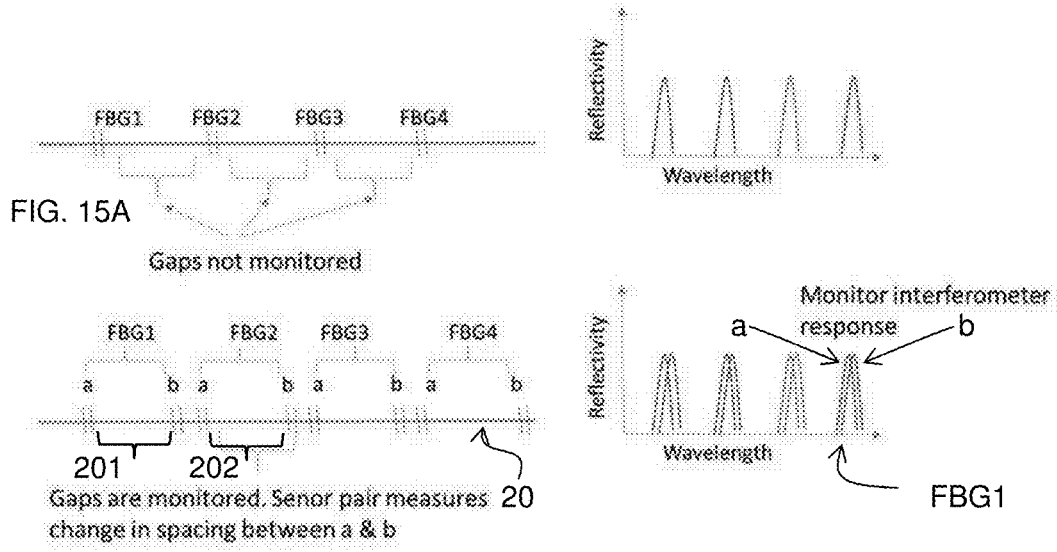
FIG. 15A, 15B illustrate an alternative arrangement of optic strain-sensor elements within a fiber optic sensor.

FIG. 15 A,B illustrate aspects of a further embodiment of an arrangement according to the present invention. Therein FIG. 15B schematically shows part of the further embodiment. Therein the optic fiber optic sensor 20 further comprises a pair FBG1 of a first and a second optic strain-sensor element a, b with at least substantially the same optical characteristics in their neutral state. and arranged at mutually opposite sides of a longitudinal section 201 of the at least one fiber optic sensor. Similarly a pair FBG2 is provided for longitudinal section 202 etc. The interrogator is configured to estimate a change in a gap between the first and the second optic strain-sensor element, a and b of FBG1 respectively, based on an interference between response optic signals received from the first and the second optic strain-sensor elements. This is schematically indicated in the right portion of FIG. 15B. For example it can be seen that the reflectivity curves of the optic strain-sensor elements a, b of pair FBG1 are mutually shifted.

For comparison FIG. 15A schematically shows the arrangement and the associated response curves for the case wherein a single FGB is provided for each section.

Figure 16:
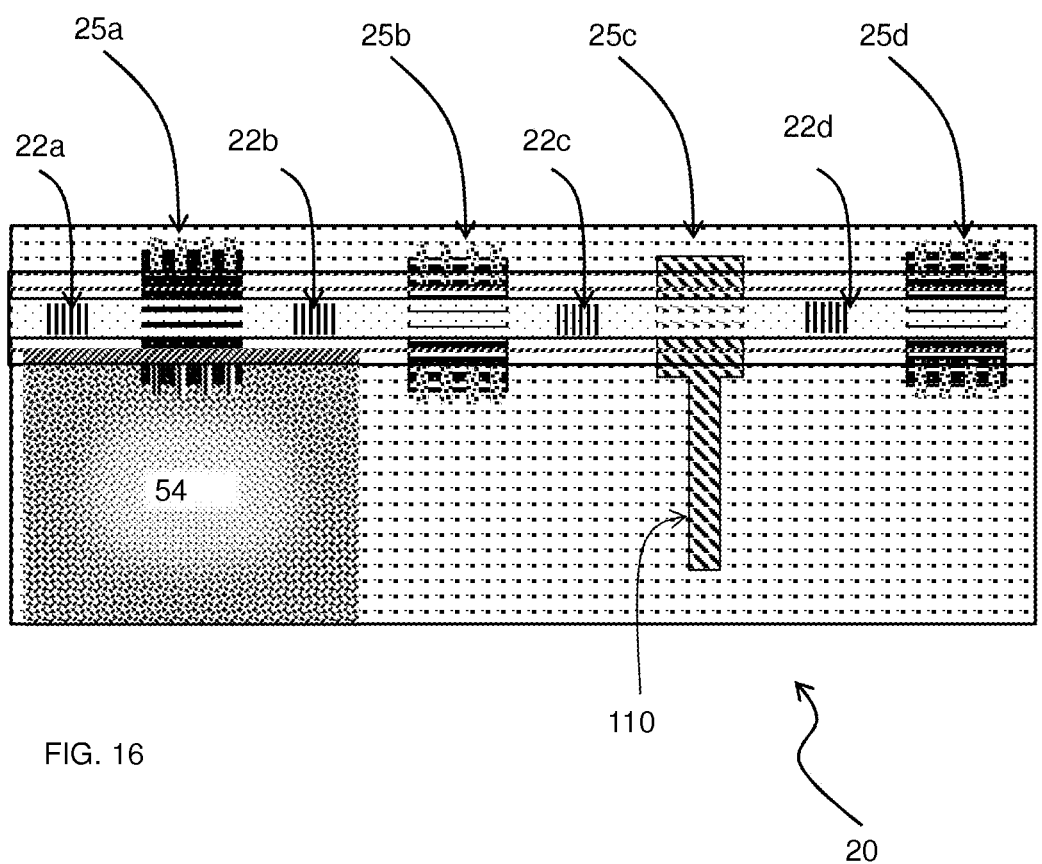
FIG. 16 illustrates an additional mounting of a fiber optic sensor.

FIG. 16 schematically illustrates an arrangement that further comprising at least one fixed/immovable mounting element 110 at a longitudinal position between mutually opposite sides of the traffic infrastructure. In an embodiment the mounting element may extend to a depth of a few cm to some tens of cm, for example 10 cm. Alternatively, the mounting element 100 extends downward substantially deeper, for example to a depth exceeding 1 m, for example exceeding 2 m wherein substantially no deformations occur due to passing by traffic.

Figure 17A:
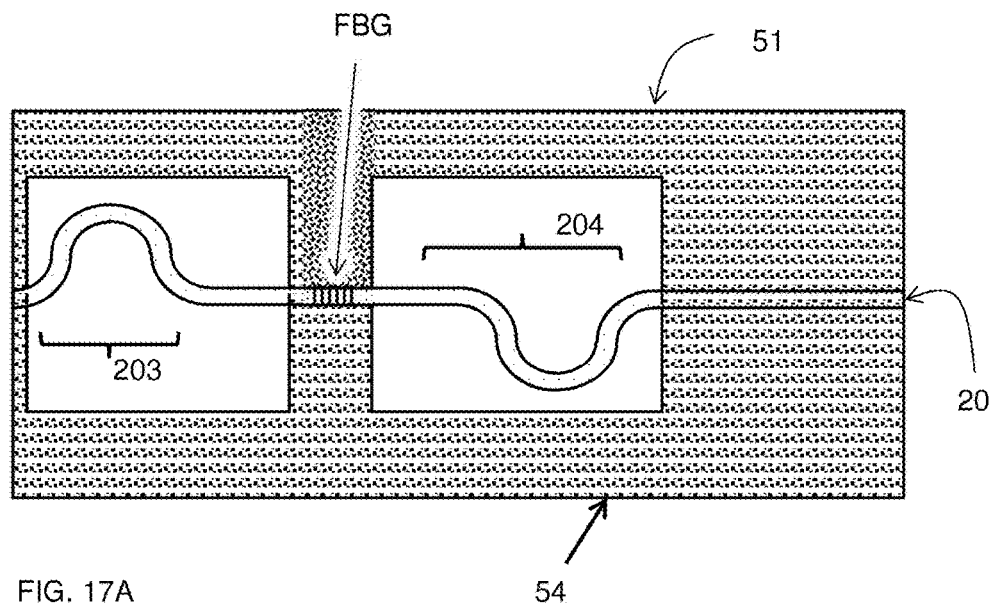
FIG. 17A, 17B illustrate alternatives for mechanically coupling/decoupling optic strain sensor elements to/from the traffic infrastructure.

FIG. 17A schematically shows an arrangement that comprises an optic sensor element FBG below the traffic carrying surface 51 that is mechanically decoupled from said traffic infrastructure in a longitudinal direction of the fiber optic sensor 20. The element FBG is however mechanically coupled to the infrastructure in a transversal direction.

Figure 17B:
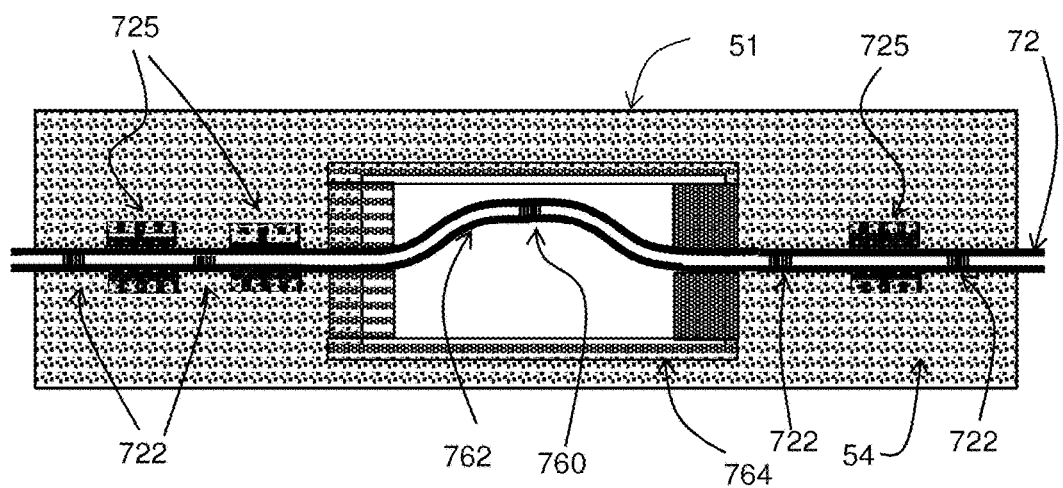

FIG. 17B schematically shows an example wherein the optic sensor element 760 is at least substantially mechanically decoupled in any direction. The interrogator module (not shown) is arranged for determining a temperature based on response optical signals obtained from the mechanically decoupled optic sensor element 760. In this example, the optic sensor element 760 is mechanically decoupled from the traffic infrastructure in that it is accommodated in a rigid housing 764. In this case a longitudinal section 762 of the fiber optic sensor 72 comprising the mechanically decoupled optic sensor element is arranged free from longitudinal tension inside the housing 764 in that the longitudinal section is arranged with slack therein. Alternatively a longitudinal section of the fiber optic sensor 72 may be arranged with a substantially constant pre-strain inside the housing. By way of example other optic sensor elements 722 are shown in FIG. 17B that are directly mechanically coupled to the infrastructure 54.

Figure 18:
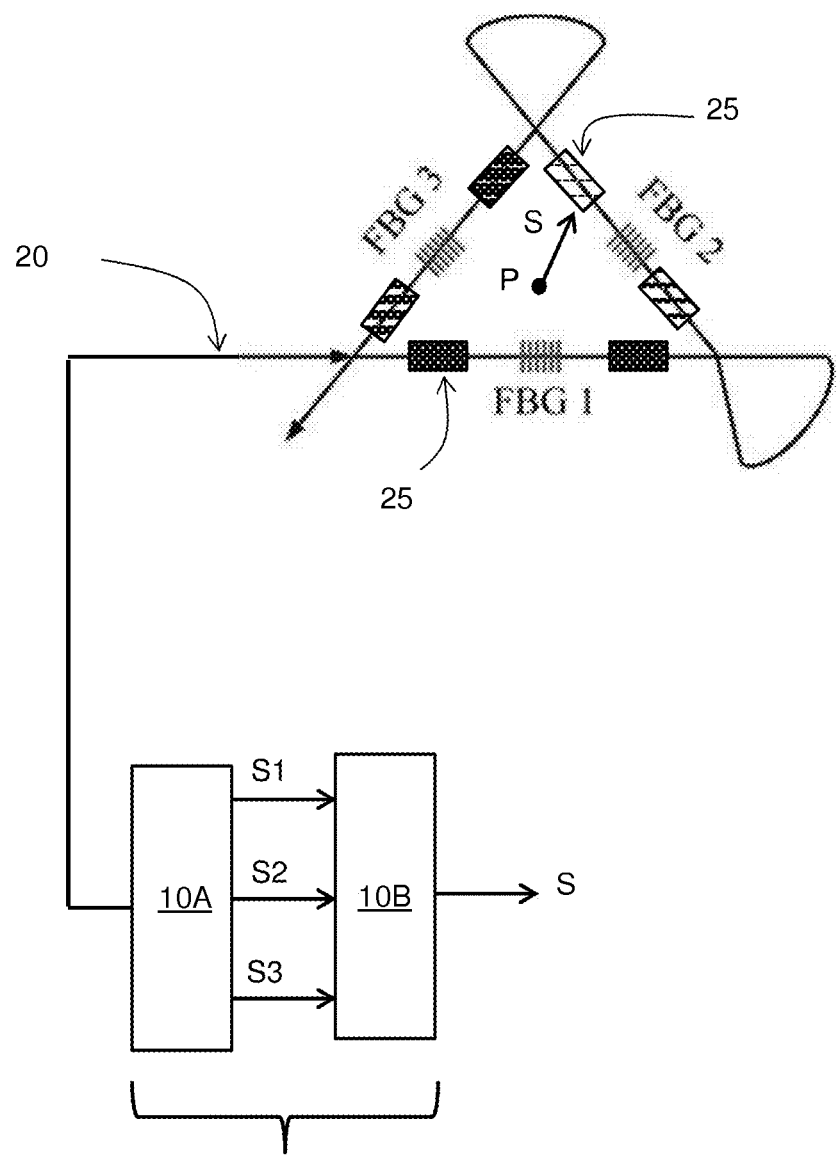
FIG. 18 shows an alternative sensor element arrangement.

FIG. 18 schematically shows an optic sensor system 10, 20 wherein the plurality of optic strain sensor elements includes a set of strain sensor elements FBG1, FBG2, FBG3 arranged in mutually different angles, here at angles mutually differing by 120 degrees around a measurement position P within a plane substantially parallel to the traffic infrastructure surface. The interrogator 10 is configured to estimate a strain vector S indicative for a magnitude and a direction of a strain at the measurement position P. In the embodiment shown the interrogator 10 has a conversion module 10A to convert an optic response signal into a detection signal having a magnitude indicative for a detected strain S1, S2, S3 of the optic strain sensor elements FBG1, FBG2, FBG3. The interrogator 10 further has a combination module 10B that computes the strain vector S from the values S1, S2, S3 detected for the respective angles of the sensors FBG1, FBG2, FBG3. In the embodiment shown the set of strain sensor elements FBG1, FBG2, FBG3 is part of a single optic fiber 20.

Figure 19A:
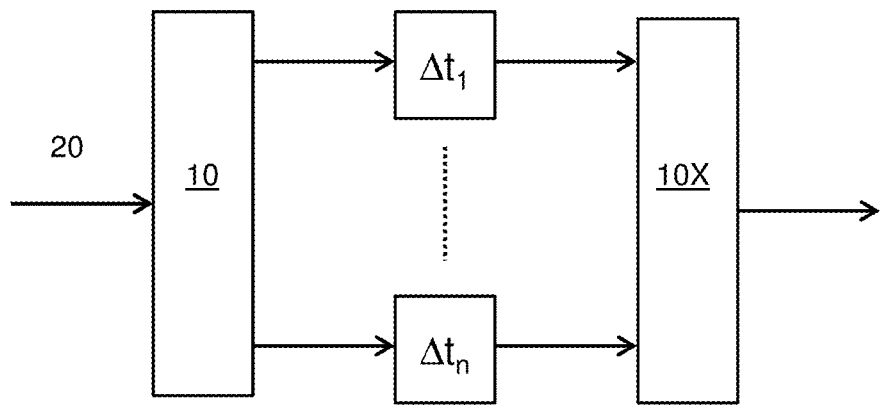
FIG. 19A, 19B illustrate embodiments of an interrogator.
Figure 19B:
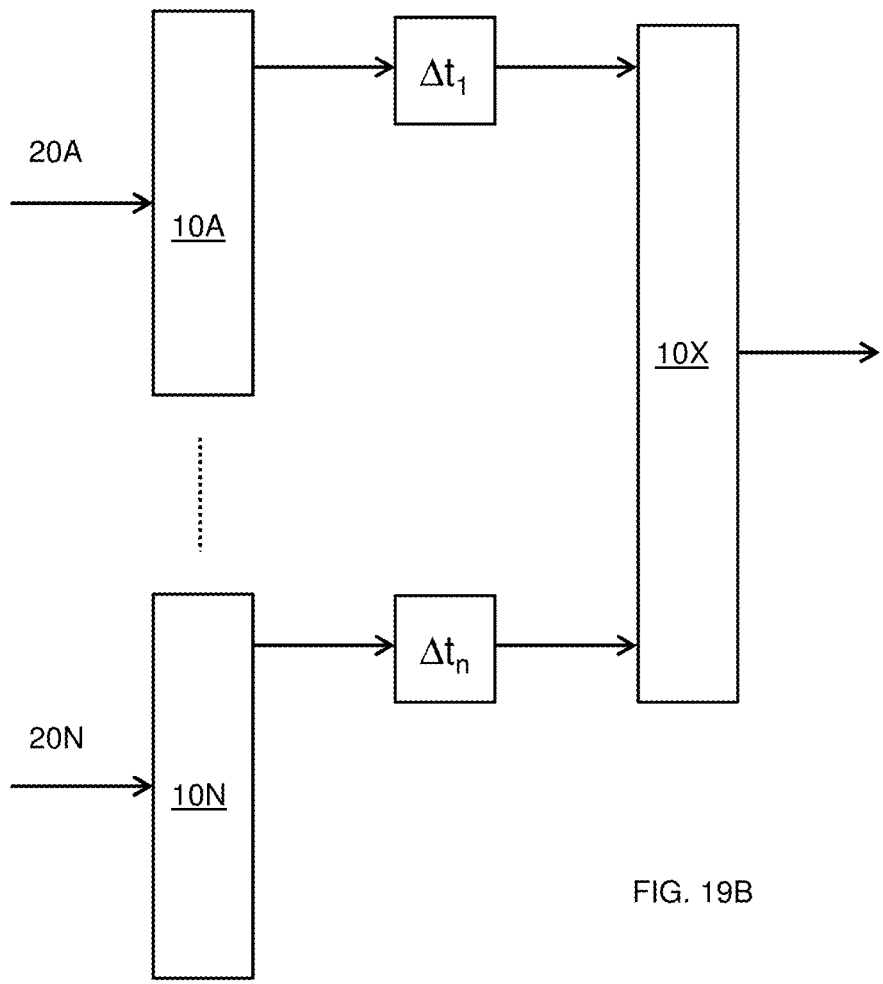

FIG. 19A, 19B show embodiments wherein the optic sensor system comprises a plurality of optic strain-sensor elements that are distributed in a longitudinal direction of the road. The interrogator is configured to track motion of a vehicle in the longitudinal direction by associating subsequent response optic signals from respective ones of said optic strain-sensor elements associated with a traversal of the vehicle, to determine a magnitude of these subsequent response optic signals, therewith obtaining a time series of magnitudes and to determine whether variations are present in the time series.

In the first embodiment, schematically illustrated in FIG. 19A, the fiber optic sensor 20 extends in a longitudinal direction of the road. In this case the interrogator 10 renders detection signals for the plurality of optic strain-sensor elements in the fiber optic sensor 20 and delays their signals with respective delays $\Delta_{t1}, \ldots \Delta_{tm}$. The delays correspond to an estimated velocity of a passing by vehicle so that module 10X can correlate these signals and determine whether amplitude variations occur between mutually delayed signals.

In the second embodiment a plurality of fiber optic sensors 20A, . . . , 20N is provided that are arranged at mutually different longitudinal positions transverse to a longitudinal direction of the road and the plurality of optic strain-sensor elements that are distributed in a longitudinal direction of the road comprise optic strain-sensor elements of respective ones of plurality of fiber optic sensors 20A, . . . , 20N. In this case a first interrogator module 10A provides a detection signal for a strain sensor element of fiber optic sensors 20A, and likewise further interrogator modules up to 10N provide a respective detection signal for a strain sensor element of further fiber optic sensors up to 20N. The properly delayed signals are analogously processed as in the embodiment of FIG. 19B.

Figure 20:
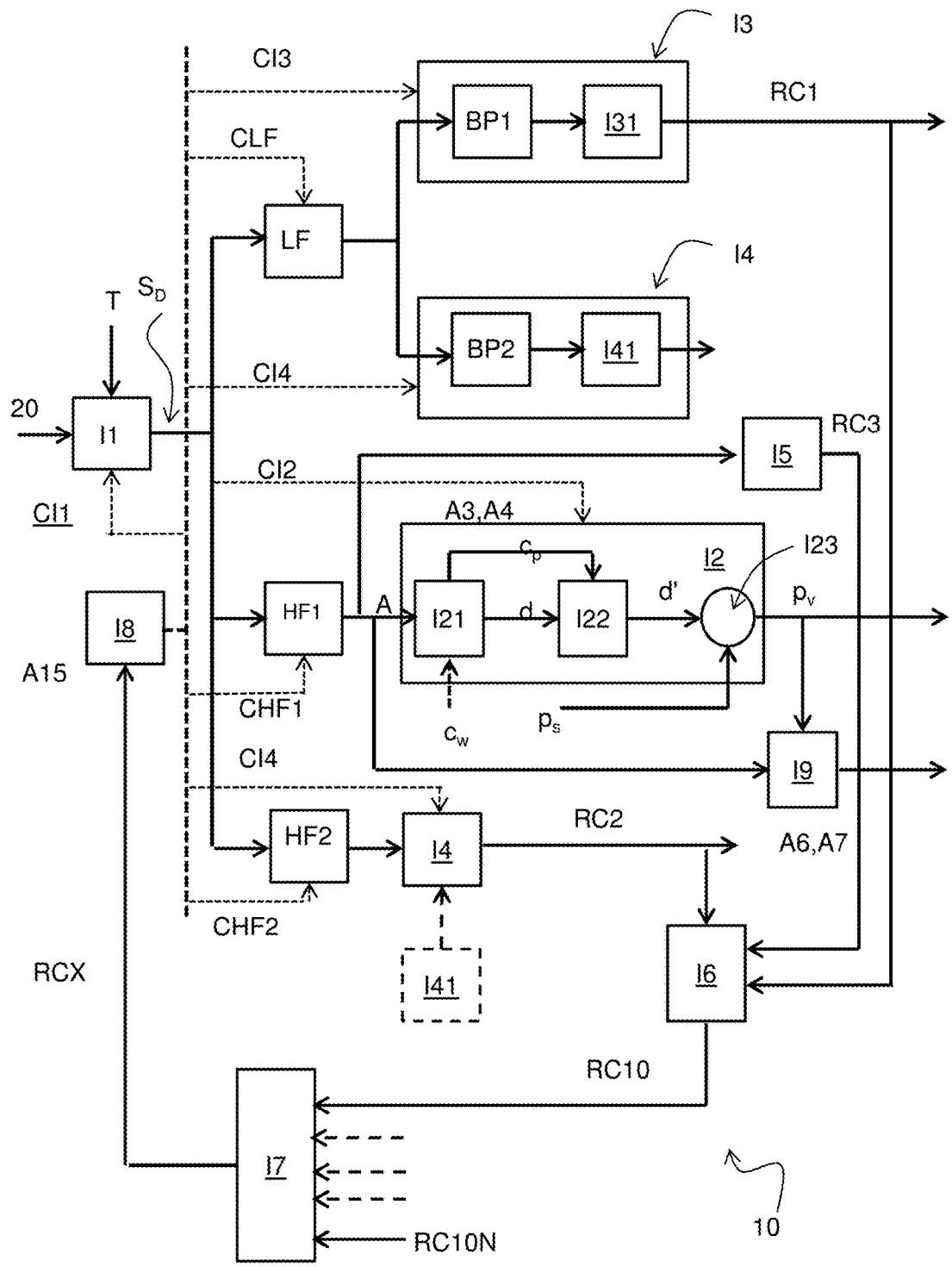
FIG. 20 illustrates various optional features to be implemented in an interrogator.

FIG. 20 shows an example of an interrogator 10 providing various signal processing features. The interrogator comprises a conversion module I1 to convert an optic response signal of an optic strain sensor element of a fiber optic sensor into a detection signal $S_D$ having a magnitude indicative for a detected strain of the optic strain sensor element. As mentioned before, fiber optic sensor 20 typically comprises a plurality of optic strain sensor elements, and the conversion module I1 will provide respective detection signals for each of the sensor elements. In the embodiment shown the interrogator 10 includes a temperature estimation module to estimate a value for a temperature T of an optic strain-sensor element and the conversion module I1 includes a compensation module that uses the estimated value to compensate a response optic signal received from the optic strain-sensor element for temperature. While only a signal temperature signal is shown, in fact separate temperature signals may be provided for each sensor element.

A signal filter HF1 is provided to determine high-frequency components in the detection signal $S_D$. The interrogator is configured to further process the high frequency components to derive signal features related to traffic carried by the traffic carrying surface. To that end the interrogator is provided with a position reconstruction unit I2 that estimates a position $p_v$ of the vehicle. The position reconstruction unit I2 includes a first module I21 that uses the amplitude A to estimate a distance d (in the plane of the surface of the traffic infrastructure) between the position ps of the sensor and the position of the vehicle. Dependent on a signal cp, the estimated value d is selectively inverted in a second module I22 and the selectively inverted signal d' is added in a third module I23 to the position ps of the sensor to obtain the estimated position pv of the vehicle. In this case the signal cp is generated by the first module of the position reconstruction unit. To that end the first module I21 may include a gradient detector, that upon detection of an increasing amplitude A, issues a signal cp that causes the second module to invert the signal d. The gradient detector may include a low-pass filter to reject noise in the input signal A. In other embodiments the signal cp may be provided by another source, for example obtained on the basis of a crude estimation of the vehicle's position. The position reconstruction unit I2 may receive an estimation cw of the vehicle's weight for example based on other sensor readings. In the absence of this information the current amplitude may be normalized by division with the maximum amplitude detected. Once the vehicle has traversed the sensor, the maximum amplitude is known. Alternatively, the weight of the vehicle can be estimated from the maximum amplitude so determined, so that at a subsequent point in time the relative position of the vehicle can be determined at that subsequent point in time. If further desired, the position of the vehicle before traversal may be estimated retroactively.

The interrogator 10 further includes a signal filter LF to determine low-frequency components in the detection signal $S_D$. The interrogator 10 is configured to decompose the low-frequency components into first and second subcomponents, the first subcomponents being in a lower frequency range than said second subcomponents. In particular, the interrogator 10 is provided with a first evaluation unit I3 having a first band pass filter BP1 that selectively transmits the first subcomponents, and a second evaluation unit I4 having a second band pass filter BP2 that selectively transmits the second subcomponents. The first evaluation unit I3 comprises a processing module I31 that further processes the first subcomponents to derive signal features related to a mechanical behavior of the traffic infrastructure, e.g. the occurrence of permanent deformation of the traffic infrastructure. The second evaluation unit I4 comprises a processing module I41 to further process the second subcomponents to derive signal features related to a static load of the traffic infrastructure, e.g. caused by parked vehicles.

The interrogator 10 is configured to identify first and second high frequency subcomponents within the high frequent components in the detection signal, in that the interrogator 10 comprises in addition to the filter HF1 a further high pass filter HF2. The second high frequency subcomponents passed by filter HF2 are within a frequency range that is higher than a frequency range of the first high frequency components passed by HF1. The interrogator 10 comprises a third evaluation unit I4 to further process the second high frequency subcomponents to output an infrastructure condition signal related to a magnitude of the second high frequency subcomponents. If the traffic infrastructure surface is of a good quality a magnitude of second high frequency subcomponents will be low. However if the surface is damaged, due to frost or other causes, a vehicle traversing the damage portions will induce high frequent vibrations that are detected by evaluation unit I4.

In the embodiment shown the third evaluation unit I4 may alternatively or additionally be coupled to an acceleration sensor I41 that is mechanically coupled to the traffic infrastructure. In that case the third evaluation unit I4 may identify a high frequent component in an output signal provided by the acceleration sensor I41 and output an infrastructure condition signal related to a magnitude of the high frequency component therein.

The interrogator 10 is provided with a fourth evaluation unit I5 that is configured to determine a change of amplitude in a temporal pattern of the detection signal $S_D$. The fourth evaluation unit I5 estimates a viscoelastic state of the road, using a model that relates the temporal pattern to the viscoelastic state. The model for example takes into account that in case of a low viscosity of the road, the slopes of the temporal pattern will be steeper than in case of a higher viscosity.

A general infrastructure state evaluation unit I6 may receive status signals RC1, RC2, RC3 provided by evaluation units I3, I4 and I5. Therewith the general infrastructure state evaluation unit I6 may generate a general state evaluation signal RC10 specifying various aspects of the state of the traffic infrastructure as determined on the basis of the signals obtained from the fiber optic sensor 20 and optionally additional sensor I41.

A global infrastructure state evaluation unit I7 may generate a global state signal RCX using the general state evaluation signal RC10 and corresponding general state evaluation signals, e.g. RC10N obtained from interrogators provide for other fiber optic sensors 20 in the optic sensor system.

A correction unit I8 is provided that uses the global state signal RCX to compensate for deviations in the detected signals due to spatial or temporal variations in visco-elastic properties of the traffic infra structure, long term deviations of the infrastructure and the like. To that end it provides control signals CI1, CI2, CI3, CI4, CLF, CHF1, CHF2 etc for the various units in the interrogator 10.

The correction unit I8 of the interrogator 10 may further be configured to process the response optic signal of each optic strain-sensor element in accordance with a specific geometrical configuration of the traffic infrastructure in the neighborhood of said each optic strain-sensor element and to compensate for mutual differences in geometrical configuration in the respective neighborhoods of optic strain-sensor elements.

It is noted that the interrogator may include a signal analysis module for estimating properties of noise present in the response optic signal and a signal filter module to adaptively filter the response optic signal based on the estimation of said properties. Such a signal analysis module may for example be part of the conversion module I1.

The interrogator 10 as shown includes demultiplexing/deconvolution module I9 configured to use information about a relative position of a conveyance element to decompose a response optic signal into a signal component contributed to by that conveyance element and a remainder signal component not contributed to by that conveyance element. The demultiplexing module I9 may for example use a relative position d' estimated in unit I2 for this purpose. The demultiplexing/deconvolution module I9 of the interrogator in this case is further configured to use the information about the relative position of the conveyance element to decompose a response optic signal into a signal component contributed to by that conveyance element at a point in time and a remainder signal component not contributed to by that conveyance element at that point in time.

Figure 21:
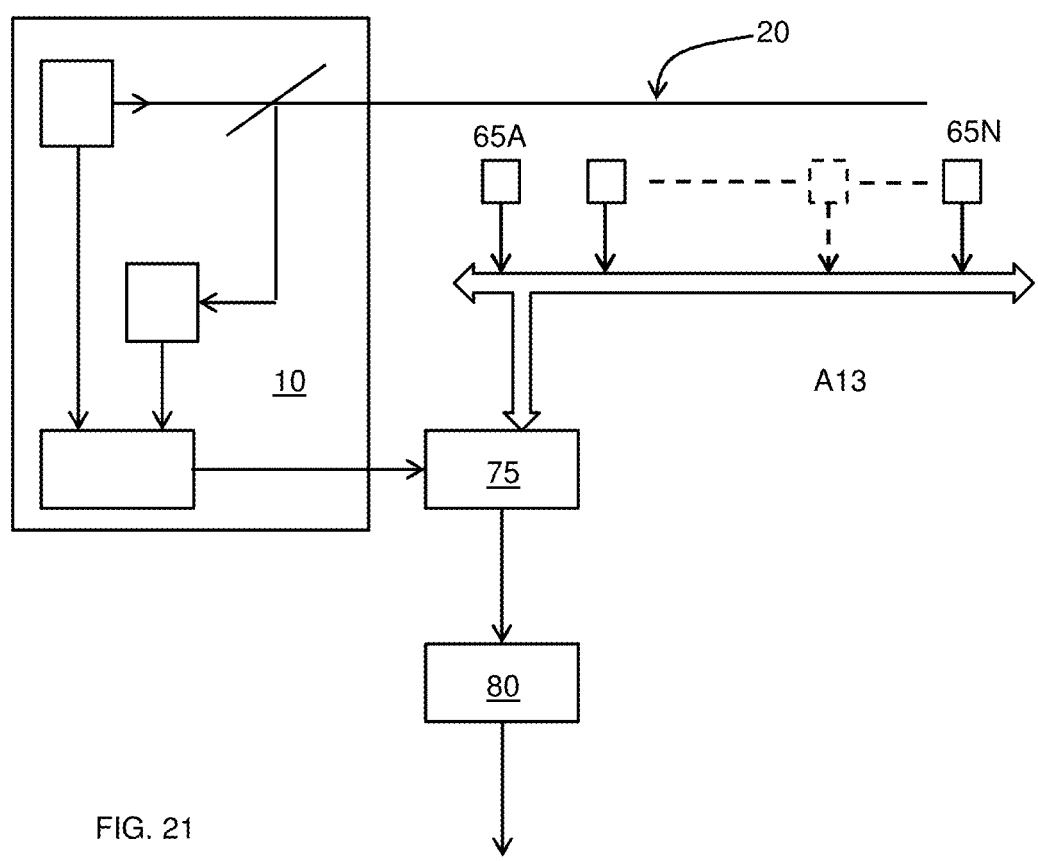
FIG. 21 shows an arrangement combining the optic sensor system with further sensor elements.

FIG. 21 shows an embodiment wherein the arrangement further comprises one or more optical sensors 65A, . . . ,65N, for sensing objects present on the traffic infrastructure surface. A data integration module 75 is provided that combines the output data from the interrogator 10 with that of the optical sensors 65A, . . . ,65N. The data integration module 75 may for example provide an improved estimation of positions or velocities of vehicles.

Figure 22:
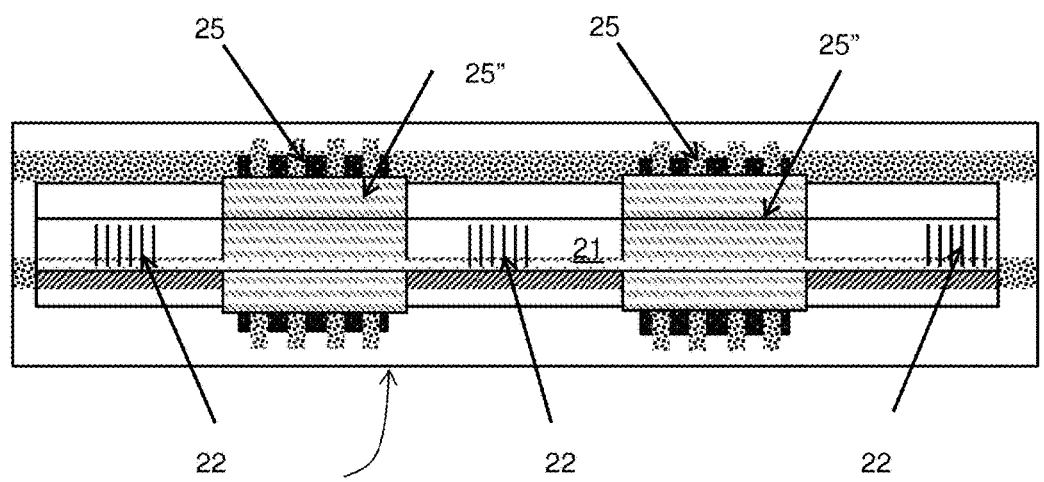
FIG. 22 shows a further alternative for a mechanical coupling of optic strain sensor elements to the traffic infrastructure.

FIG. 22 shows an embodiment wherein the optic strain-sensor elements 22 are mechanically coupled to the traffic infrastructure by a coupling element 25" that selectively inhibits mechanical vibrations having a frequency exceeding a threshold frequency. The interrogator is configured to interrogate the at least one of the optic strain-sensor elements at a repetition rate of at least twice that threshold frequency. In the embodiment shown the coupling element is provided as a dampening element 25" between the anchoring elements 25 and the optic fiber 21 comprising the optic strain-sensor elements 22.

The invention claimed is:
1. An arrangement comprising:
   a traffic infrastructure comprising:
      a traffic carrying surface to support at least one conveyance element of a vehicle, therewith allowing movements of the vehicle over the traffic carrying surface; and an optic sensor system comprising:
  at least one fiber optic sensor coupled to an interrogator, having at least one anchor element that extends around the at least one fiber optic sensor between an optic strain sensor element of a plurality of optic strain sensor elements, and extending at least substantially according to a straight line in a direction at least substantially parallel to the traffic carrying surface, the at least one fiber optic sensor comprising:
    an optic fiber with the plurality of optic strain-sensor elements distributed over its length, wherein the plurality of optic strain-sensor elements have mutually different optical characteristics, and
  the interrogator arranged below the traffic carrying surface and being configured to:
    transmit an optical interrogation signal into the at least one fiber optic sensor,
    receive a response optical signal that has been modulated by the fiber optic sensor based on its optical characteristics, and
    identify changes in the optical characteristics of the response optical signal resulting from strains induced in the optic strain-sensor elements as a result of the conveyance element of the vehicle moving over the traffic carrying surface across the at least one fiber optic sensor.

2. The arrangement according to claim 1, wherein the at least one fiber optic sensor is provided with at least one anchor element that extends around the at least one fiber optic sensor between mutually subsequent optic strain-sensor elements, the at least one anchor element having a circumference in a plane transverse to a longitudinal direction of the at least one fiber optic sensor that is at least 1.5 times larger than a circumference of the fiber optic sensor in a plane transverse to the longitudinal direction at a position of an optic strain-sensor element.

3. The arrangement according to claim 1, wherein the at least one fiber optic sensor is arranged in a direction transverse to a longitudinal direction of the traffic infrastructure.

4. The arrangement according to claim 1, wherein the at least one fiber optic sensor is arranged in a direction longitudinal along the direction of the traffic infrastructure.

5. The arrangement according to claim 1, wherein the interrogator is configured to derive a set of signal features indicative for a shape of a temporal pattern of the response optical signal.

6. The arrangement according to claim 1, wherein the interrogator is configured to derive a set of signal features by using a model that relates properties of the conveyance element and or its kinetic state to a shape of the temporal pattern.

7. The arrangement according to claim 1, wherein the interrogator is configured to extract a spatial pattern indicative for a spatial footprint of a plurality of tires of a vehicle.

8. The arrangement according to claim 1, wherein respective optical signals of the plurality of optic strain-sensor elements of the at least one fiber optic sensor are processed to estimate a distance between a pair of tires on a same axle of the vehicle.

9. The arrangement according to claim 1, wherein respective optical signals of the plurality of optic strain-sensor elements of the at least one fiber optic sensor obtained for a first time-interval are processed to correlate those signals with respective optical signals of the plurality of optic strain-sensor elements of the at least one fiber optic sensor in another time interval.

10. The arrangement according to claim 1, wherein the at least one fiber optic sensor is one of a plurality of mutually parallel fiber optic sensors that are spaced relative to each other in the traffic direction.

11. The arrangement according to claim 1, wherein the at least one fiber optic sensor is arranged in a trench inside a traffic carrying layer defining the traffic carrying surface or is arranged between a support layer and a traffic carrying layer carried by the support layer.

12. The arrangement according to claim 1, wherein the optic fiber further comprises a pair of a first and a second optic strain-sensor element with at least substantially the same optical characteristics in their neutral state, and arranged at mutually opposite sides of a longitudinal section of the at least one fiber optic sensor, and wherein the interrogator is configured to estimate a change in a gap between the first and the second optic strain-sensor element based on an interference between response optic signals received from the first and second optic strain-sensor elements.

13. The arrangement according to claim 1, further comprising at least one optic sensor element below the traffic infrastructure surface that is mechanically decoupled from the traffic infrastructure in a longitudinal direction of the fiber optic sensor.

14. The arrangement according to claim 13, wherein the at least one optic sensor element that is mechanically decoupled in a longitudinal direction is at least substantially mechanically decoupled in any direction, wherein the interrogator module is arranged for determining a temperature based on response optical signals obtained from the mechanically decoupled optic sensor element.

15. The arrangement according to claim 1, wherein the interrogator is configured to process response optical signals of mutually neighboring optic strain sensor elements to determine a relative position of a conveyance element between the mutually neighboring optic strain sensor elements, using a model that relates a relationship between the response optical signals to the relative position.

16. The arrangement according to claim 1, wherein the interrogator includes a conversion module to convert an optic response signal into a detection signal having a magnitude indicative for a detected strain of the at least one optic strain sensor element.

17. The arrangement according to claim 16, wherein the interrogator further includes a signal filter to determine low-frequency components in the detection signal, and to further process the low frequency components to derive signal features related to a mechanical behavior of the traffic infrastructure.

18. The arrangement according to claim 1, further comprising a plurality of optic strain-sensor elements that are distributed in a longitudinal direction of the road, wherein the interrogator is configured to track motion of a vehicle in the longitudinal direction by associating subsequent response optic signals from respective ones of the optic strain-sensor elements associated with a traversal of the vehicle, to determine a magnitude of these subsequent response optic signals, therewith obtaining a time series of magnitudes and to determine whether a variation is present in the time series.

19. The arrangement according to claim 18, wherein the at least one fiber optic sensor is one of a plurality of fiber optic sensors that are arranged at mutually different longitudinal positions transverse to a longitudinal direction of the road, and wherein the plurality of optic strain-sensor elements that are distributed in a longitudinal direction of the road comprise optic strain-sensor elements of respective ones of the plurality of fiber optic sensors.

20. The arrangement according to claim 1, wherein the interrogator includes a temperature estimation module to estimate a value for a temperature of an optic strain-sensor element and a compensation module using the estimated value to compensate a response optic signal received from the optic strain-sensor element for temperature.

* * * * *